United States Patent
Yang et al.

(10) Patent No.: US 10,616,711 B2
(45) Date of Patent: Apr. 7, 2020

(54) METHOD AND APPARATUS FOR IDENTIFYING LOCATION OF TERMINAL IN VEHICLE

(71) Applicant: SAMSUNG ELECTRONICS CO., LTD., Suwon-si, Gyeonggi-do (KR)

(72) Inventors: Hye-jung Yang, Yongin-si (KR); Mu-sik Kwon, Seoul (KR); Jong-hyun Kim, Suwon-si (KR); Bo-seok Moon, Gunpo-si (KR); In-hak Na, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/642,518

(22) Filed: Jul. 6, 2017

(65) Prior Publication Data

US 2018/0098202 A1 Apr. 5, 2018

Related U.S. Application Data

(60) Provisional application No. 62/402,078, filed on Sep. 30, 2016.

(30) Foreign Application Priority Data

Feb. 3, 2017 (KR) .................. 10-2017-0015689

(51) Int. Cl.
*H04W 4/021* (2018.01)
*H04W 4/029* (2018.01)
*H04W 4/40* (2018.01)

(52) U.S. Cl.
CPC .......... *H04W 4/021* (2013.01); *H04W 4/029* (2018.02); *H04W 4/40* (2018.02)

(58) Field of Classification Search
CPC ....... H04W 4/046; H04W 4/40; H04W 4/025; H04L 63/107

(Continued)

(56) References Cited

U.S. PATENT DOCUMENTS 8,626,357 B1 * 1/2014 Lickfelt ................ B60R 16/037
                                                                340/5.2
10,059,342 B2 * 8/2018 Ricci ....................... H04W 4/21

(Continued)

FOREIGN PATENT DOCUMENTS

KR        10-0863106        10/2008
KR        10-1060681         8/2011

(Continued)

OTHER PUBLICATIONS

Search Report and Written Opinion dated Dec. 21, 2017 in counterpart International Patent Application No. PCT/KR2017/009149.

(Continued)

*Primary Examiner* — Mong-Thuy T Tran
(74) *Attorney, Agent, or Firm* — Nixon & Vanderhye, P.C.

(57) ABSTRACT

An apparatus for identifying a location of a terminal includes a communication unit comprising communication circuitry configured to receive, from the terminal, information corresponding to a signal transmitted from a signal generation module that is activated based on a door opening/closing of a vehicle; and a processor configured to identify the location of the terminal in the vehicle using the received information.

20 Claims, 19 Drawing Sheets

(58) Field of Classification Search
USPC .................................. 455/456.1–456.6, 457
See application file for complete search history.

(56) References Cited

U.S. PATENT DOCUMENTS

| | | | |
|---|---|---|---|
| 10,202,100 B1* | 2/2019 | Tucker | G07C 9/00309 |
| 10,313,325 B2* | 6/2019 | Park | B60R 16/023 |
| 2007/0290554 A1 | 12/2007 | Teshima et al. | |
| 2011/0105097 A1* | 5/2011 | Tadayon | H04W 4/50 |
| | | | 455/418 |
| 2012/0001876 A1* | 1/2012 | Chervenka | G09G 5/00 |
| | | | 345/204 |
| 2013/0134730 A1* | 5/2013 | Ricci | H04W 4/90 |
| | | | 296/24.34 |
| 2013/0135088 A1 | 5/2013 | Simha | |
| 2014/0179348 A1* | 6/2014 | Simon | H04W 4/027 |
| | | | 455/456.1 |
| 2014/0187219 A1* | 7/2014 | Yang | H04W 4/046 |
| | | | 455/418 |
| 2014/0213234 A1* | 7/2014 | Inselberg | H04W 4/021 |
| | | | 455/418 |
| 2014/0232569 A1 | 8/2014 | Skinder et al. | |
| 2014/0309862 A1* | 10/2014 | Ricci | G01C 21/26 |
| | | | 701/36 |
| 2015/0105100 A1* | 4/2015 | Magarida | H04M 1/6075 |
| | | | 455/456.1 |
| 2016/0036964 A1 | 2/2016 | Barfield, Jr. et al. | |
| 2016/0112846 A1* | 4/2016 | Siswick | H04B 17/27 |
| | | | 455/456.4 |
| 2016/0165031 A1* | 6/2016 | Gopinath | H04M 1/6091 |
| | | | 455/569.2 |
| 2016/0176382 A1* | 6/2016 | Siswick | B60R 25/2045 |
| | | | 701/2 |
| 2016/0185358 A1* | 6/2016 | Todasco | B60W 50/12 |
| | | | 701/48 |
| 2016/0241698 A1 | 8/2016 | Kim | |
| 2016/0337814 A1 | 11/2016 | Van Wiemeersch | |
| 2017/0208438 A1* | 7/2017 | Dickow | H04W 4/046 |
| 2017/0251092 A1* | 8/2017 | Elie | H04W 4/80 |

FOREIGN PATENT DOCUMENTS

| | | |
|---|---|---|
| KR | 10-1535773 | 7/2015 |
| KR | 10-2016-0100560 | 8/2016 |
| WO | 2016/076587 | 5/2016 |

OTHER PUBLICATIONS

Communication pursuant to Rule 164(1) EPC dated May 9, 2019 in counterpart European Patent Application No. 17856574.3.
Extended Search Report dated Aug. 12, 2019 in counterpart European Patent Application No. 17856574.3.

* cited by examiner

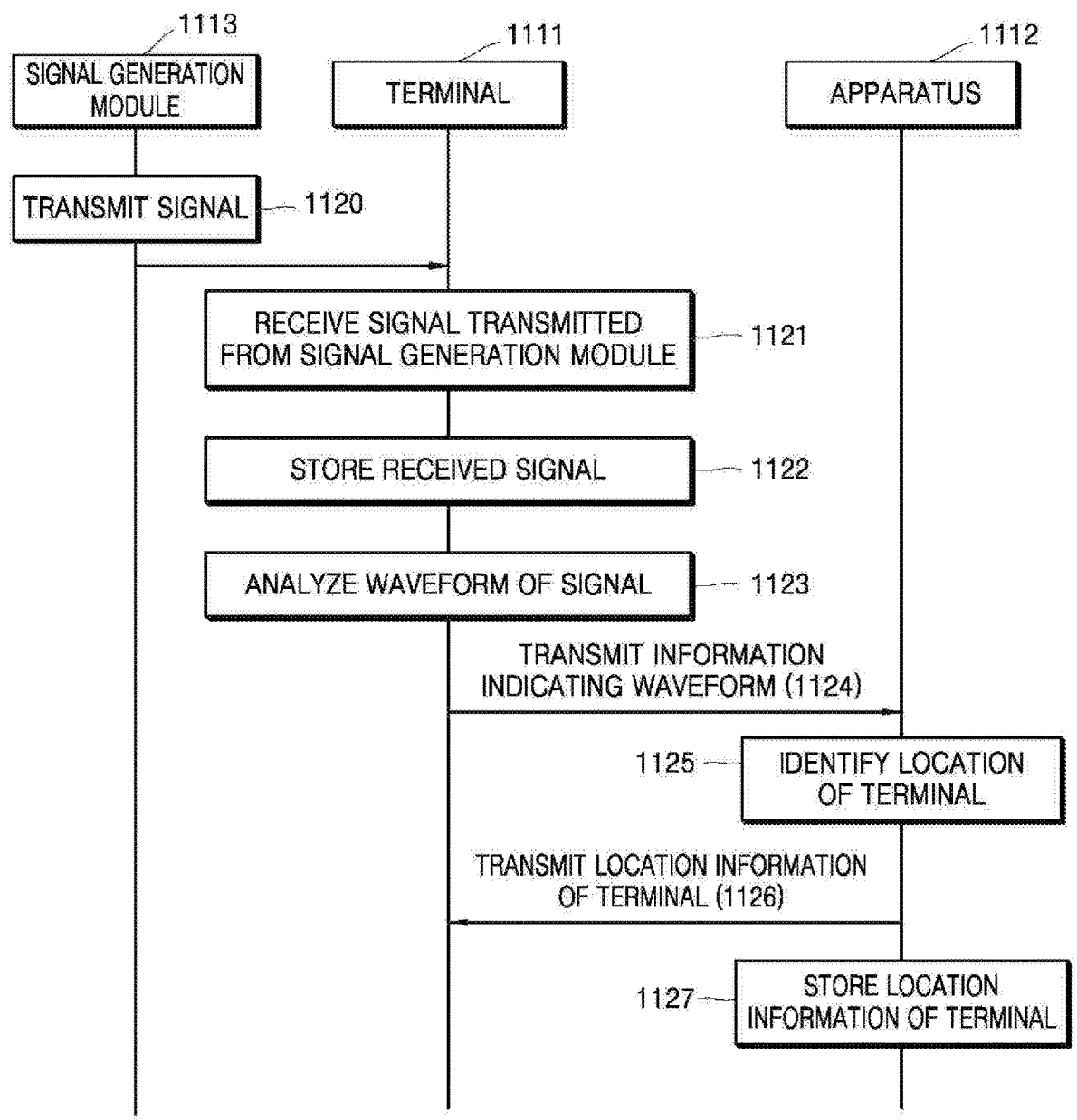

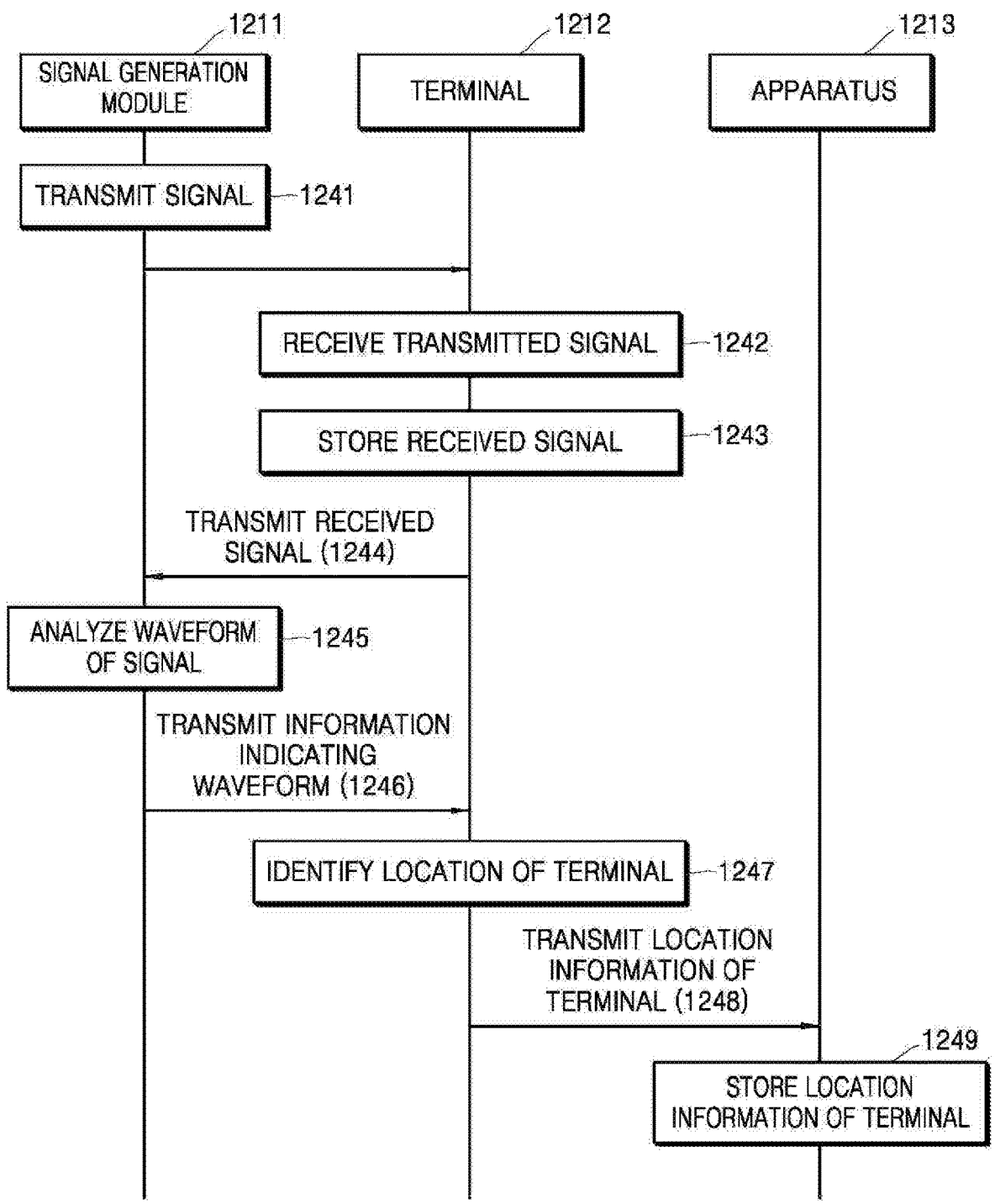

METHOD AND APPARATUS FOR IDENTIFYING LOCATION OF TERMINAL IN VEHICLE

CROSS-REFERENCE TO RELATED APPLICATIONS

This application is based on and claims priority under 35 U.S.C. § 119 to U.S. Provisional Patent Application No. 62/402,078, filed on Sep. 30, 2016, in the U.S. Patent and Trademark Office and Korean Patent Application No. 10-2017-0015689, filed on Feb. 3, 2017, in the Korean Intellectual Property Office, the disclosures of each of which are incorporated by reference herein in their entireties.

BACKGROUND

1. Field

The present disclosure relates generally to methods and apparatuses for identifying locations of terminals in vehicles.

2. Description of Related Art

With the development of network and communication technologies, a technology for performing various functions by connecting a vehicle to an external terminal has been developed.

However, in order to connect a vehicle to an external terminal, a user has to inconveniently manipulate an apparatus installed in the vehicle to connect the vehicle to the external terminal. Accordingly, the demand for a technology that allows a vehicle to automatically identify a location of an external terminal so that the vehicle is connected to the external terminal without a user's intervention has increased.

SUMMARY

Methods and apparatuses for identifying locations of terminals in vehicles are provided. In addition, computer-readable recording media having embodied thereon programs for executing the methods are also provided. Additional aspects will be set forth in part in the description which follows and, in part, will be apparent from the description.

According to an aspect of an example embodiment, an apparatus for identifying a location of a terminal includes: a communication unit comprising communication circuitry configured to receive, from the terminal, information corresponding to a signal transmitted from a signal generation module comprising signal generation circuitry that is activated based on a door opening/closing of a vehicle; and a processor configured to identify the location of the terminal in the vehicle using the received information.

According to an aspect of another example embodiment, a method of identifying a location of a terminal includes: activating a signal generation module based on a door opening/closing of a vehicle; receiving, from the terminal, information corresponding to a signal transmitted by the signal generation module; and identifying the location of the terminal in the vehicle using the received information.

According to an aspect of another example embodiment, a non-transitory computer-readable recording medium has embodied thereon a program for executing the method.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 11 is a flowchart illustrating an example case where a processor identifies a location of a terminal according to another example embodiment;

FIGS. 12A, 12B, 12C and 12D are flowcharts illustrating an example case where a signal generation module operates according to various example embodiments;

DETAILED DESCRIPTION

The terms used in the present disclosure are selected from among common terms that are currently widely used in consideration of their function in the present disclosure. However, the terms may be different according to an intention of one of ordinary skill in the art, a precedent, or the advent of new technology. Also, in particular cases, the terms may be arbitrarily selected, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the present disclosure, when a part "includes" an element, it is to be understood that the part additionally includes other elements rather than excluding other elements as long as there is no particular opposing recitation. Also, the terms such as " . . . unit", "module", or the like used in the present disclosure may refer to a unit, which processes at least one function or motion, and the unit may be implemented by hardware or software, or by a combination of hardware and software.

The present disclosure will now be described in greater detail with reference to the accompanying drawings. The present disclosure may, however, be embodied in many different forms and is not to be understood as being limited to the various example embodiments set forth herein.

As used herein, the term "and/or" includes any and all combinations of one or more of the associated listed items. Expressions such as "at least one of" when preceding a list of elements, modify the entire list of elements and do not modify the individual elements of the list.

The present disclosure will now be described in greater detail with reference to the accompanying drawings, in which various example embodiments of the present disclosure are illustrated.

Figure 1:
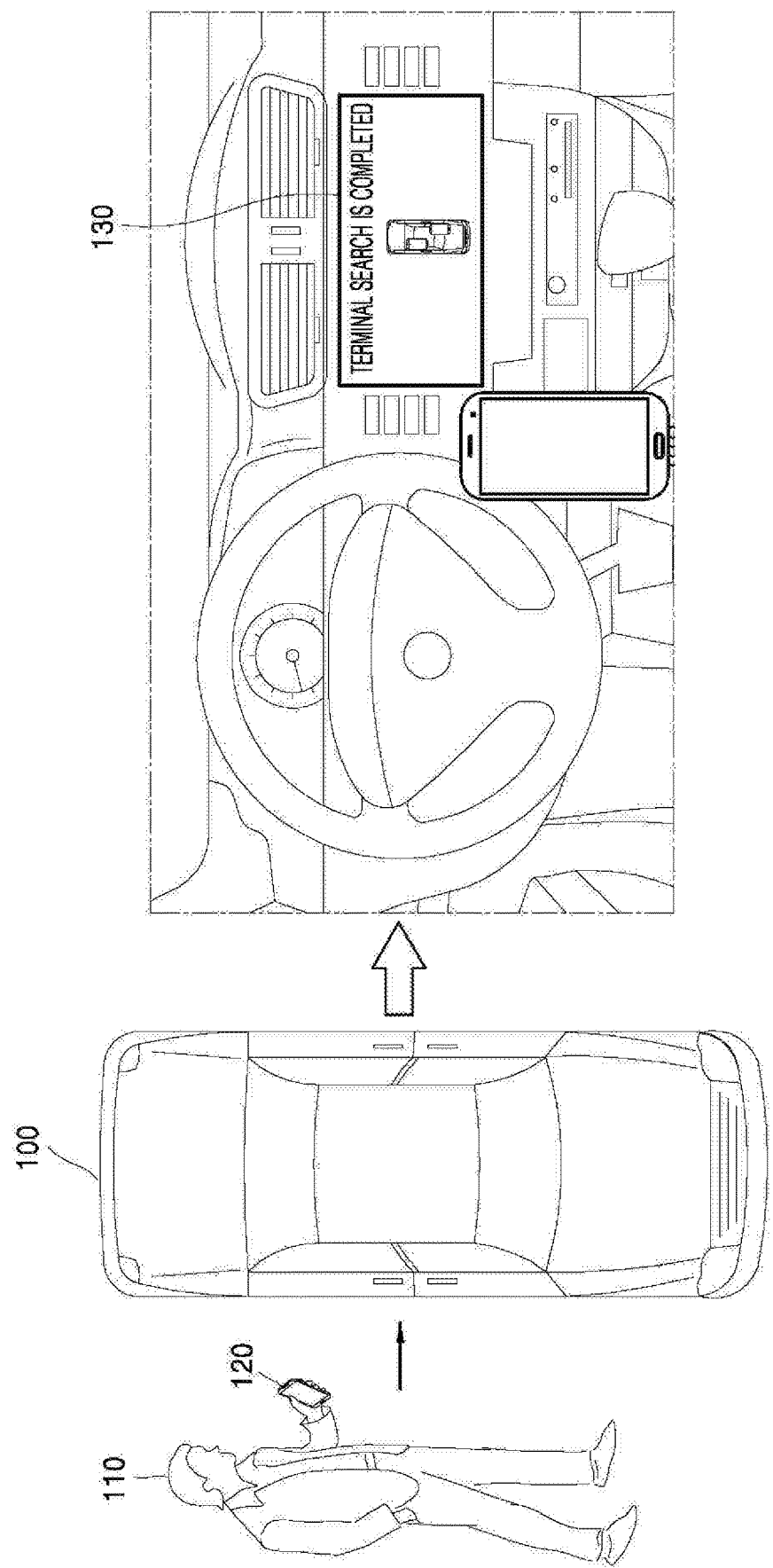
FIG. 1 is a diagram illustrating an example method of identifying a location of a terminal according to an example embodiment.

FIG. 1 is a diagram illustrating an example method of identifying a location of a terminal according to an example embodiment.

FIG. 1 illustrates a rider 110 who is to get in a vehicle 100 and a terminal 120 of the rider 110. The rider 110 may be a driver of the vehicle 100 or a passenger riding with the driver. Also, the terminal 120 may be an apparatus owned by the rider 110. Examples of the terminal 120 may include, for example, and without limitation, a smartphone, a tablet PC, and a wearable device, or the like.

When the rider 110 gets in the vehicle 100, a vehicle driving assistance apparatus (hereinafter, referred to as an 'apparatus') 130 in the vehicle 100 identifies a location of the terminal 120 in the vehicle 100. For example, the apparatus 130 may be a center information display (CID) apparatus of the vehicle 100 or may be a computing device that may be additionally installed in the vehicle 100. The term 'computing device' used herein may refer, for example, to a device that may transmit/receive information and may process data.

A processor of the apparatus (e.g., including processing circuitry) 130 may identify a location of the terminal 120 using information received from the terminal 120. For example, the terminal 120 may receive a signal transmitted from a signal generation module installed in the vehicle 100. The term 'signal generation module' may refer, for example, to a module that generates and transmits a signal for short-range wireless communication. For example, the signal generation module may be, but is not limited to, a Bluetooth low energy (BLE) module.

The terminal 120 transmits information corresponding to the received signal to the apparatus 130. Examples of the information corresponding to the received signal may include, for example, and without limitation, the signal transmitted from the signal generation module, information indicating a waveform of the signal transmitted from the signal generation module, ID information of the signal generation module, location information of the signal generation module, and ID information of a door in which the signal generation module is mounted. A communication unit (e.g., including communication circuitry) of the apparatus 130 receives the information from the terminal 10 and the processor of the apparatus 130 identifies a location of the terminal 120 by using the received information. Also, the apparatus 130 may perform pairing and connection with the terminal 120.

Unless described otherwise, the term 'processor' below may refer, for example, to the processor of the apparatus 130 and the term 'communication unit' below may refer, for example, to the communication unit of the apparatus 130.

In general, in order to connect different devices, a user has to connect the devices using a cable or has to perform pairing by manipulating the devices. Also, it is difficult for one device to automatically identify a location of another device without the user's intervention.

The apparatus 130 according to an example embodiment may automatically identify a location of the terminal 120 of the rider 110 in the vehicle 100. Also, the apparatus 130 may be automatically connected to the terminal 120 without intervention of the rider 110. Accordingly, the apparatus 130 may be wirelessly connected to the terminal 120 without any manipulation of the rider 110 and may transmit/receive data to/from the terminal 120. Also, the apparatus 130 may allocate a task to the terminal 120 and may receive a result of the task from the terminal 120.

Also, when a plurality of the terminals 120 are in the vehicle 100, the apparatus 130 may identify a location of each of the plurality of terminals 120 and may set an authorization level of each of the plurality of terminals 120. The apparatus 130 may allocate a task corresponding to the authorization level of each terminal 120 to the terminal 120.

An example where the apparatus 130 identifies a location of the terminal 120 will now be explained in greater detail with reference to FIGS. 2 through 14. The apparatus 130 will be explained with reference to FIGS. 15 and 16.

Figure 2:
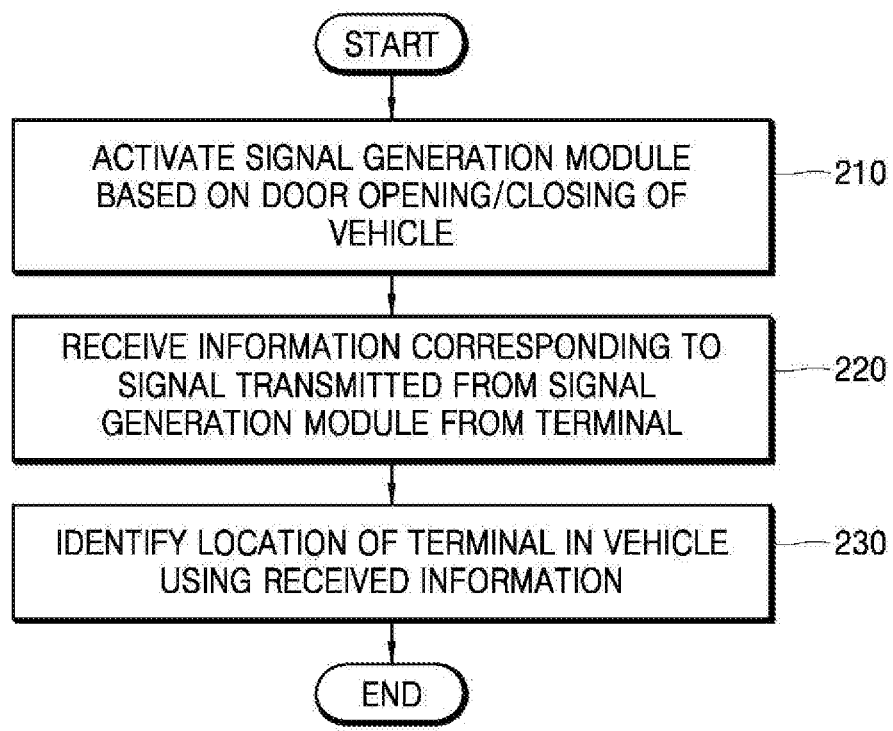
FIG. 2 is a flowchart illustrating an example method of identifying a location of a terminal according to an example embodiment.

FIG. 2 is a flowchart illustrating an example method of identifying a location of a terminal according to an example embodiment.

In operation 210, a signal generation module is activated based on a door opening/closing of a vehicle.

The signal generation module may include signal generation circuitry embedded in each of a plurality of doors of a vehicle. The signal generation module may be activated based on a door opening/closing of the vehicle. For example, the signal generation module may be activated when a sensor (e.g., a motion sensor) embedded in a door of the vehicle detects motion of a rider. The signal generation module may be activated on its own or may be activated by a control signal of a processor. Power needed as the signal generation module is activated may be standby power of the vehicle. A case where the signal generation module is activated will be explained below with reference to FIGS. 3 through 5.

In operation 220, a communication unit receives information corresponding to a signal transmitted from the signal generation module from a terminal. In other words, the terminal receives the signal transmitted from the signal generation module and transmits the information corresponding to the received signal to the communication unit.

For example, the terminal may directly transmit the signal received from the signal generation module to the communication unit. Alternatively the terminal may transmit information indicating a waveform (e.g., a waveform indicating a signal intensity) of the signal received from the signal generation module to the communication unit. For example, the terminal may generate a graph showing a relationship between an intensity of the signal and a time and may transmit information about the generated graph to the communication unit.

A case where an apparatus including the communication unit receives the information corresponding to the signal from the terminal will be explained in greater detail below with reference to FIG. 6.

Referring back to FIG. 2, in operation 230, a processor identifies a location of the terminal in the vehicle by analyzing the waveform of the signal included in the received information.

For example, when a user of the terminal opens a door of a driver's seat of the vehicle, a signal generation module (hereinafter, referred to as a 'first signal generation module') installed in or adjacent to the driver's seat is activated. Accordingly, the terminal receives a signal transmitted from the first signal generation module. Also, when another door of the vehicle is opened or closed, a signal generation module (hereinafter, referred to as a 'second signal generation module') installed adjacent to the opened/closed door is activated. Accordingly, the terminal may receive not only a signal transmitted from the first signal generation module but also a signal transmitted from the second signal generation module.

The processor identifies a location of the terminal in the vehicle using the information (e.g., the information corresponding to the signal transmitted from the signal generation module) received from the terminal. For example, the processor may select a signal with a highest peak value from among signals transmitted from a plurality of signal generation modules. The processor may identify which signal generation module transmits the selected signal and may determine a seat adjacent to a door in which the identified signal generation module is installed as a location of the terminal.

Also, when a plurality of signal generation modules are activated, the processor may identify a location of the terminal by using a triangulation method. For example, the processor may calculate (determine) a distance between the terminal and each of the activated signal generation modules by using a distance between the activated signal generation modules and an angle between the terminal and each of the activated signal generation modules.

A case where the processor identifies a location of the terminal will be explained in greater detail below with reference to FIGS. 7 through 9.

Figure 3:
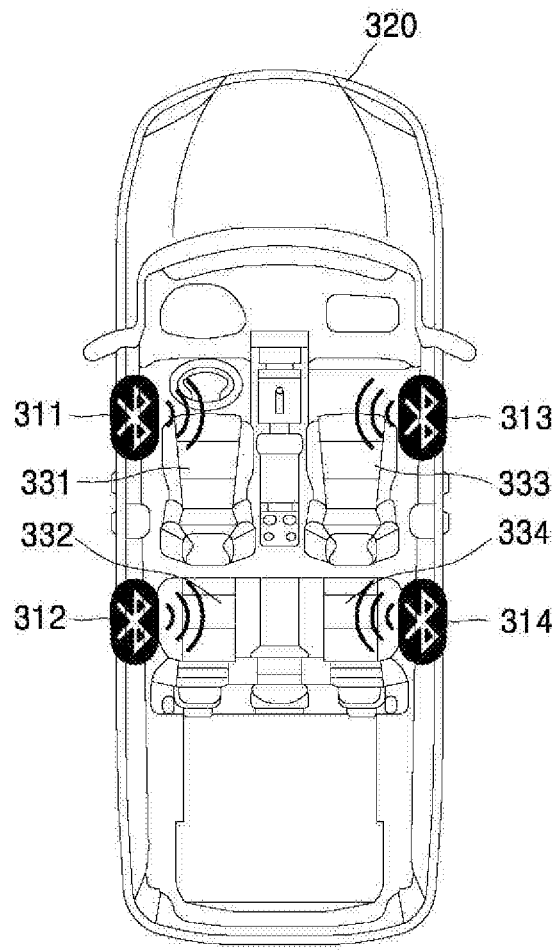
FIG. 3 is a is a diagram illustrating an example signal generation module embedded in a vehicle according to an example embodiment.

FIG. 3 is a diagram illustrating an example signal generation module embedded in a vehicle according to an example embodiment.

FIG. 3 illustrates a vehicle 320 into which signal generation modules (e.g., including signal generation circuitry) 311, 312, 313, and 314 are provided. Although the signal generation modules 311, 312, 313, and 314 are BLE modules in FIG. 3, the various example embodiments are not limited thereto. In other words, each of the signal generation modules 311, 312, 313, and 314 may be a module that may generate a signal for short-range wireless communication with a terminal of a rider.

For example, the signal generation modules 311, 312, 313, and 314 may be respectively embedded in doors of the vehicle 320. Alternatively, the signal generation modules 311, 312, 313, and 314 may be respectively embedded adjacent to seats 331, 332, 333, and 334. However, locations of the signal generation modules 311, 312, 313, and 314 are not limited thereto. In other words, when the rider seats in any one of the seats 331, 332, 333, and 334, locations of the signal generation modules 311, 312, 313, and 314 are not limited as long as the signal generation modules 311, 312, 313, and 314 may perform wireless communication with the terminal of the rider.

Figure 4:
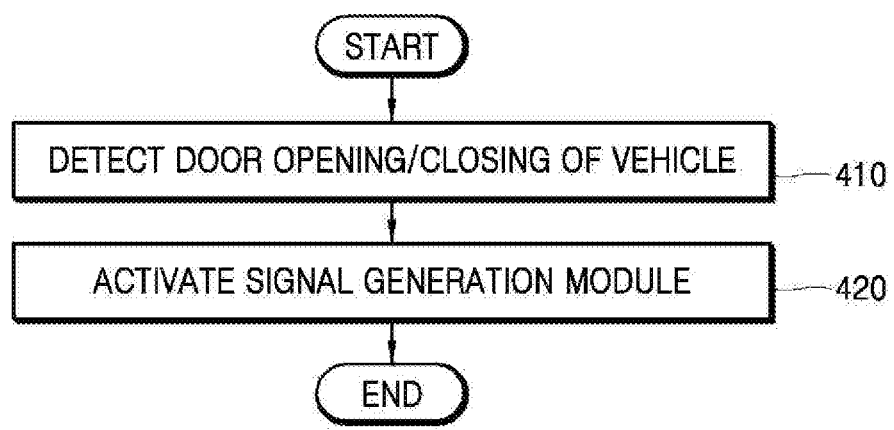
FIG. 4 is a flowchart illustrating an example case where a signal generation module is activated according to an example embodiment.

FIG. 4 is a flowchart illustrating an example case where a signal generation module is activated according to an example embodiment.

In operation 410, a sensor included in a vehicle detects a door opening/closing of a vehicle.

For example, a sensor embedded in or adjacent to a door of the vehicle may detect whether the door of the vehicle is opened or closed. Also, the sensor may detect whether a rider gets in or off the vehicle.

When the vehicle has a plurality of doors, the sensor may detect whether each of the doors is opened/closed. When the sensor detects that a door of the vehicle is opened/closed, the sensor may notify an apparatus including a processor that the door of the vehicle is opened/closed.

In operation 420, a signal generation module is activated.

When a door of the vehicle is opened/closed, the respective signal generation module is activated. For example, as a door of the vehicle is opened/closed, the signal generation module therein may be automatically activated. Alternatively, the signal generation module may be activated according to a control signal from the processor. The signal generation module may be activated by using standby power of the vehicle.

Figure 5:
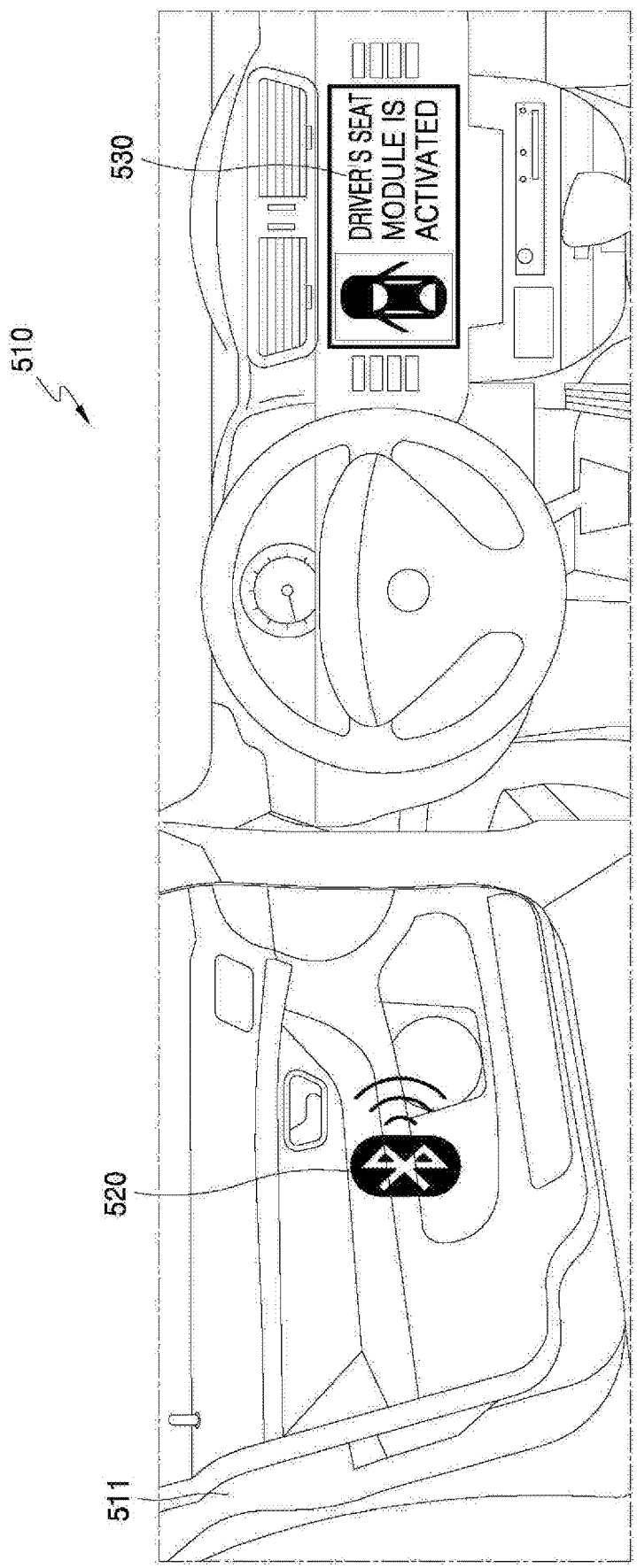
FIG. 5 is a diagram illustrating an example case where a signal generation module is activated according to an example embodiment.

FIG. 5 is a diagram illustrating an example case where a signal generation module is activated according to an example embodiment.

In FIG. 5, a door 511 of a vehicle 510 is opened. A sensor embedded in the door 511 may detect that the door 511 is opened, and a signal generation module 520 may be activated as the door 511 is opened. For example, the signal generation module 520 may be activated on its own or may be activated by a control signal of a processor included in an apparatus 530. Alternatively, the sensor embedded in the door 511 may detect that the door 511 is closed, and the signal generation module 520 may be activated as the door 511 is closed.

Once the signal generation module 520 is activated, the processor may output information about a location (e.g., a driver's seat) of the signal generation module 520 that is activated through a screen or a speaker of the apparatus 530.

Figure 6:
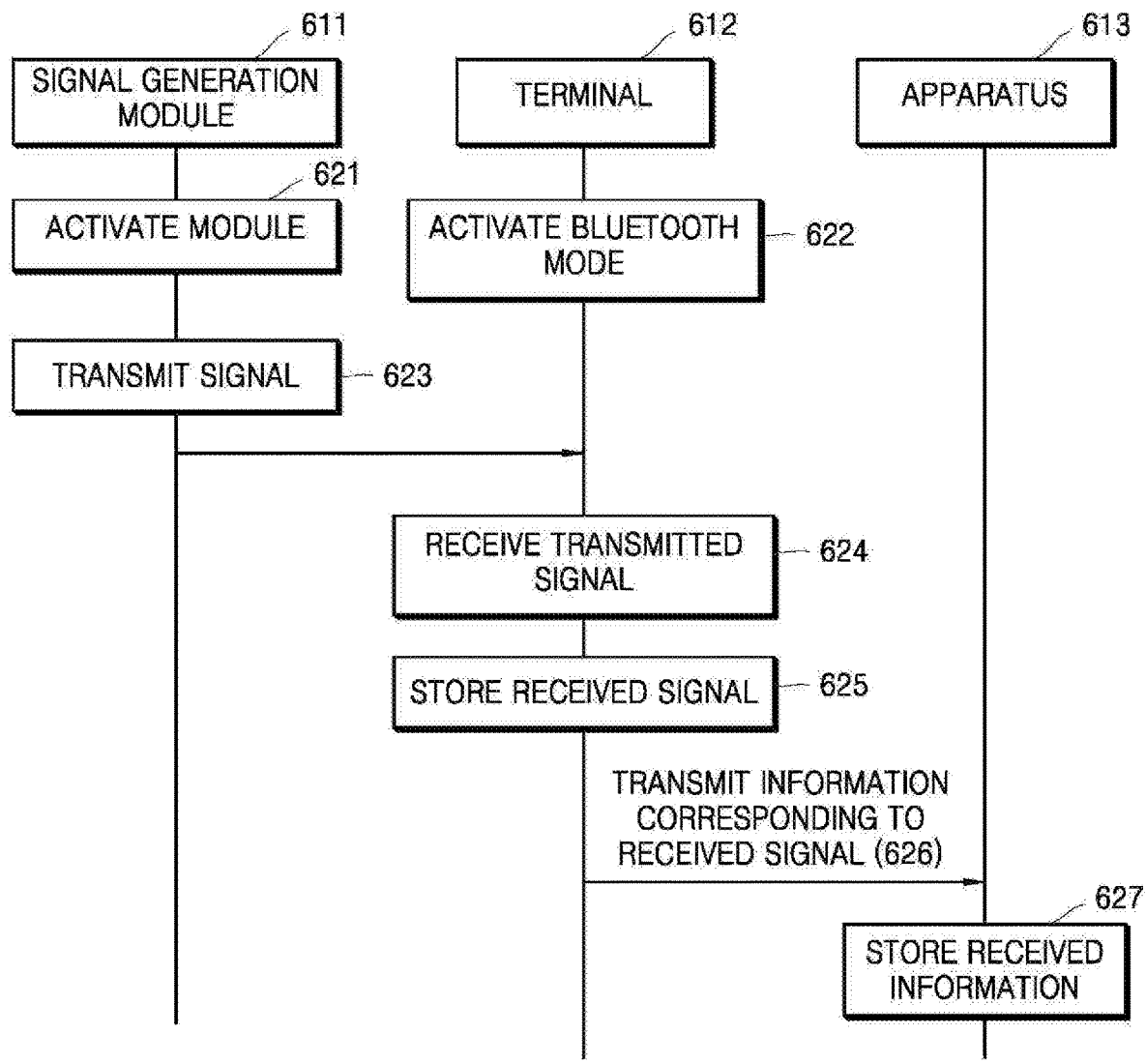
FIG. 6 is a flowchart illustrating an example case where an apparatus including a communication unit receives information from a terminal according to an example embodiment.

FIG. 6 is a flowchart illustrating an example case where an apparatus including a communication unit receives information from a terminal according to an example embodiment.

In FIG. 6, a signal generation module 611 transmits a signal, a terminal 612 receives the signal from the signal generation module 611, and a communication unit included in an apparatus 613 receives information corresponding to the signal from the terminal 612.

In operation 621, the signal generation module 611 is activated. For example, the signal generation module 611 may be activated according to a door opening/closing of a vehicle.

In operation 622, a Bluetooth mode of the terminal 612 is activated. For example, a user of the terminal 612 may activate the Bluetooth mode of the terminal 612 before or after the user gets in the vehicle.

In operation 623, the signal generation module 611 transmits a signal. For example, when the signal generation module 611 is a BLE module, the signal generation module 611 may transmit a Bluetooth signal.

In operation 624, the terminal 612 receives the signal transmitted from the signal generation module 611. For example, the terminal 612 may continuously receive the signal transmitted from the signal generation module 611 for a predetermined period of time.

In operation 625, the terminal 612 stores the received signal. However, according to the setting of the terminal 612, operation 625 may not be performed.

In operation 626, the terminal 612 transmits information corresponding to the signal to the apparatus 613. Examples of the information corresponding to the signal may include, without limitation, the signal transmitted from the signal generation module 611, information indicating a waveform of the signal transmitted from the signal generation module 611, ID information of the signal generation module 611, location information of the signal generation module 611, and ID information of a door in which the signal generation module 611 is mounted.

For example, the terminal 612 may directly transmit the signal received from the signal generation module 611 to the apparatus 613, or may transmit information indicating an intensity of the signal received from the signal generation module 611 to the apparatus 613.

In operation 627, the apparatus 613 stores the received information. For example, the communication unit of the apparatus 613 may receive the information from the terminal 612, and a processor of the apparatus 613 may store the received information in a memory.

Figure 7:
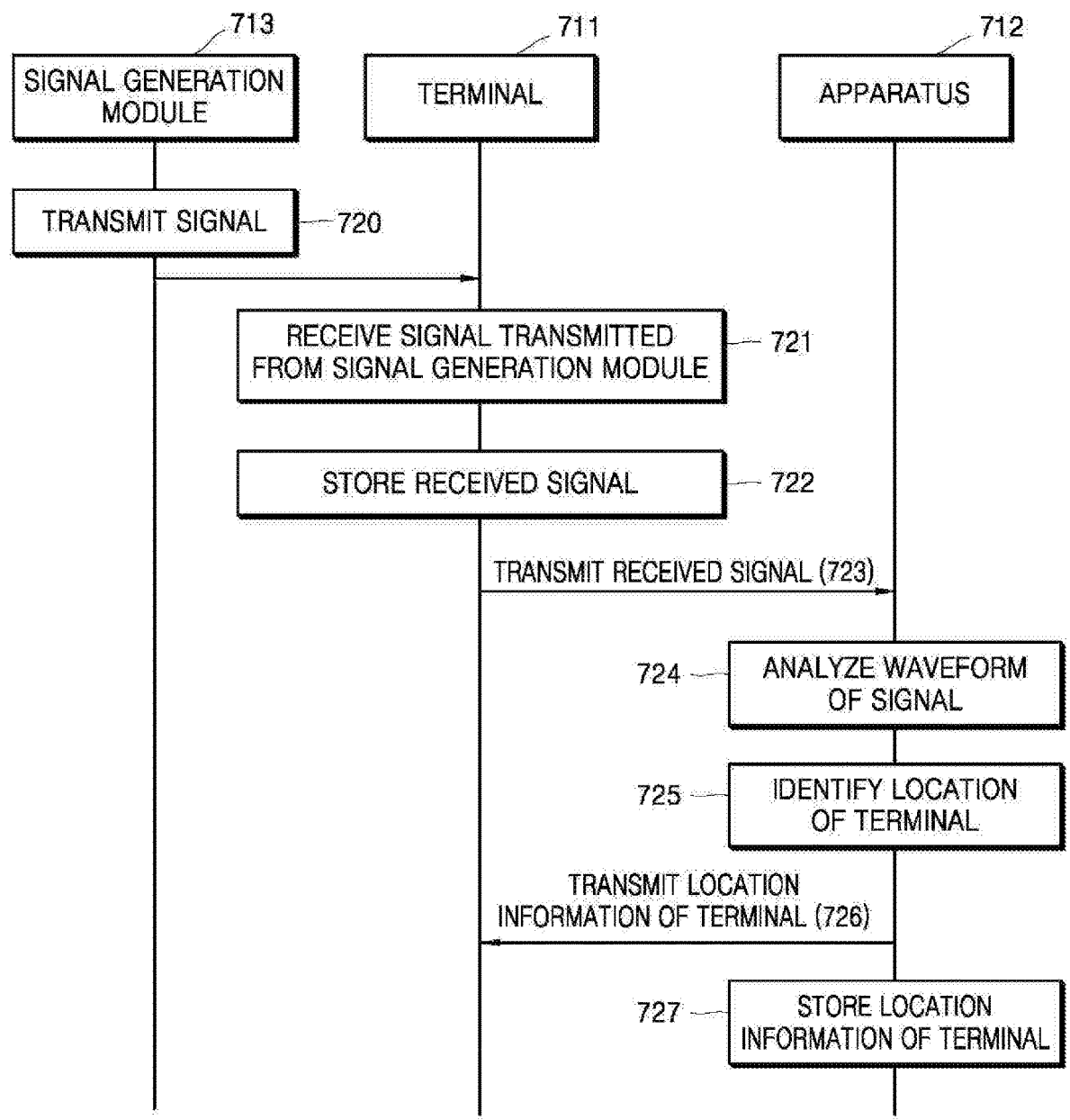
FIG. 7 is a flowchart illustrating an example case where a processor identifies a location of a terminal according to an example embodiment.

FIG. 7 is a flowchart illustrating an example case where a processor identifies a location of a terminal according to an example embodiment.

In FIG. 7, a terminal 711 transmits a signal transmitted from a signal generation module 713 to an apparatus 712 including a processor, and the processor of the apparatus 712 identifies a location of the terminal 711 by analyzing a waveform of the signal.

In operation 720, the signal generation module 713 transmits a signal. For example, when the signal generation module 713 is a BLE module, the signal generation module 713 may transmit a Bluetooth signal. Although not shown in FIG. 7, it is assumed that a Bluetooth module of the terminal 711 and the signal generation module 713 are activated before operation 720.

In operation 721, the terminal 711 receives the signal transmitted from the signal generation module 713. For example, the terminal 711 may activate a Bluetooth mode and may receive a Bluetooth signal transmitted from the signal generation module 713.

In operation 722, the terminal 711 stores the received signal. However, according to the setting of the terminal 711, operation 722 may not be performed.

In operation 723, the terminal 711 transmits the received signal to the apparatus 712.

In operation 724, the apparatus 712 analyzes a waveform of the signal. For example, the processor of the apparatus 712 analyzes a waveform of the signal transmitted from the terminal 711. For example, a communication unit of the apparatus 712 may receive the signal from the terminal 711 for a predetermined period of time, and the processor of the apparatus 712 may monitor how an intensity of the received signal changes.

In operation 725, the apparatus 712 identifies a location of the terminal 711. For example, the processor of the apparatus 712 may identify a location of the terminal 711 in a vehicle using a result obtained after analyzing the waveform of the signal. For example, the processor may identify which signal generation module transmits a signal with a highest intensity (e.g., a signal with a highest peak value) and may determine a seat adjacent to a door in which the identified signal generation module is installed as a location of the terminal.

In operation 726, the apparatus 712 transmits location information of the terminal 711 to the terminal 711. In other words, the apparatus 712 transmits information about the location of the terminal 711 in the vehicle to the terminal 711. However, according to the setting of the apparatus 712, operation 726 may not be performed.

In operation 727, the apparatus 712 stores the location information of the terminal 711. For example, the processor of the apparatus 712 may store the location information of the terminal 711 in a memory.

Figure 8A:
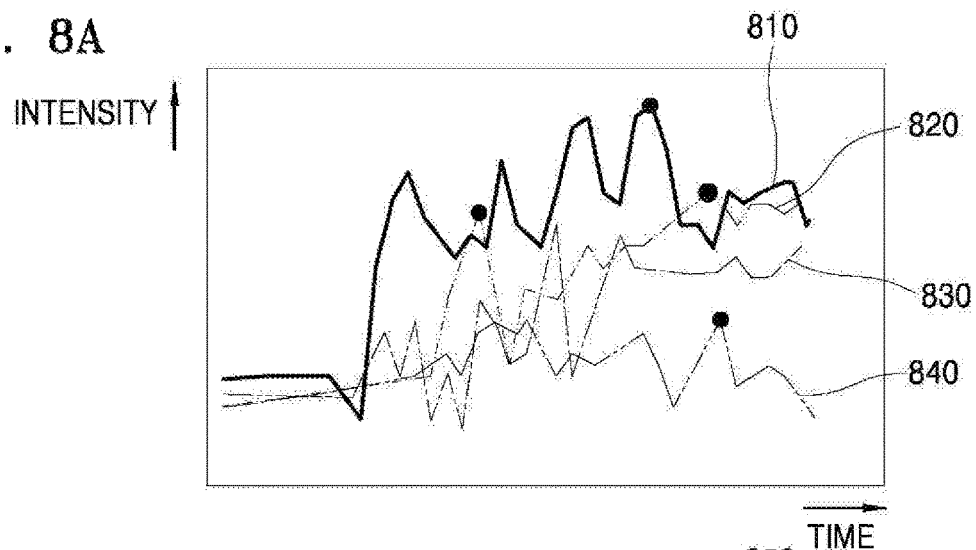
FIGS. 8A, 8B and 8C are diagrams illustrating an example case where a processor identifies a location of a terminal according to various example embodiments.
Figure 8B:
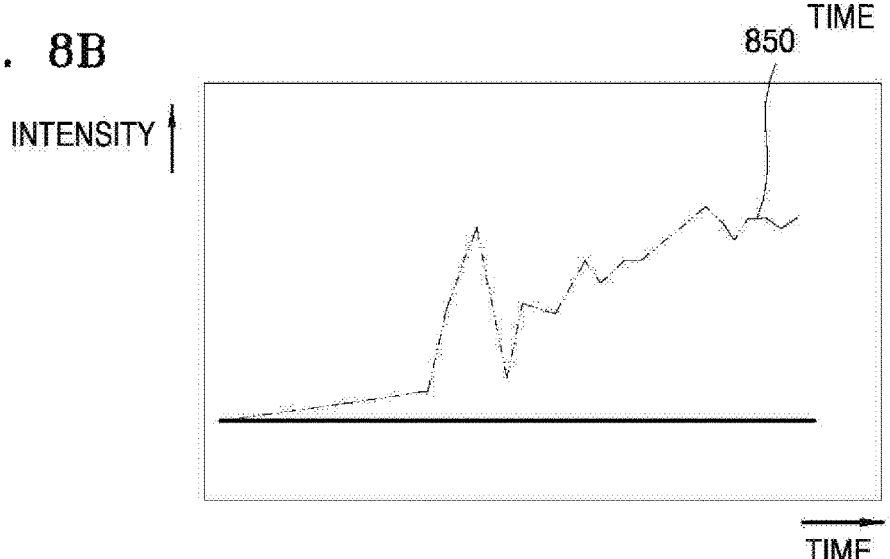
Figure 8C:
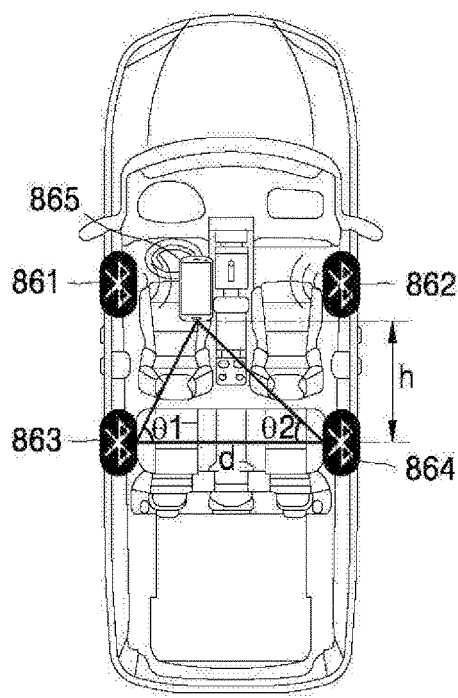

FIGS. 8A, 8B and 8C are diagrams illustrating an example case where a processor identifies a location of a terminal according to various example embodiments.

FIGS. 8A and 8B are diagrams illustrating an example case where a processor identifies a location of a terminal using a result obtained after analyzing a waveform of a signal. FIG. 8A illustrates that a plurality of signal generation modules transmit signals. FIG. 8B illustrates that a single signal generation module transmits a signal.

Referring to FIG. 8A, a processor monitors a relationship between a time and an intensity of each of a plurality of signals 810, 820, 830, and 840 received from a terminal. In some cases, a plurality of doors from among doors of a vehicle may be opened/closed at the same time. In this case, signal generation modules installed in the opened/closed doors may be activated, and the terminal may receive the plurality of signals 810, 820, 830, and 840. Accordingly, an apparatus including the processor may receive information about the plurality of signals 810, 820, 830, and 840 from the terminal.

The processor monitors changes in intensities of plurality of signals 810, 820, 830, and 840 and compares highest intensity values (for example, peak values) of the plurality of signals 810, 820, 830, and 840. The processor selects the signal 810 with a highest peak value from among the plurality of signals 810, 820, 830, and 840.

The processor identifies which signal generation module transmits the signal 810. For example, information for identifying a signal generation module may be included in each of the plurality of signals 810, 820, 830, and 840. Accordingly, the processor may identify which signal generation module transmits the signal 810 by checking the information included in the signal 810. The processor determines a seat (e.g., a driver's seat) adjacent to a door in which the signal generation module that transmits the signal 810 is installed as a location of the terminal.

Although the processor selects the signal 810 with a highest peak value from among the plurality of signals 810, 820, 830, and 840 in FIG. 8A, the various example embodiments are not limited thereto. For example, the processor may calculate (determine) intensity average values of the plurality of signals 810, 820, 830, and 840 for a predetermined period of time and may select a signal with a highest intensity average value.

Referring to FIG. 8B, the processor identifies a signal generation module that transmits a signal 850 by checking information included in the signal 850 received from the terminal. The processor determines a seat adjacent to a door in which the signal generation module that transmits the signal 850 is installed as a location of the terminal.

FIG. 8C is a diagram illustrating an example case where the processor identifies a location of a terminal 865 using a triangulation method. Although a plurality of signal generation modules 861, 862, 863, and 864 are all activated in FIG. 8C, embodiments are not limited thereto.

The processor may calculate a distance 'h' between the signal generation modules 863 and 864 and the terminal 865 by using Equation 1.

$$h = \frac{d}{\tan(90° - \theta_1) + \tan(90° - \theta_2)}. \quad (1)$$

In Equation 1, 'd' refers to a distance between the signal generation modules 863 and 864, $\theta_1$ refers to an angle between the terminal 865 and the signal generation module 863, and $\theta_2$ refers to an angle between the terminal 865 and the signal generation module 864.

The processor may previously know locations of the signal generation modules 861, 862, 863, and 864 in the vehicle. Accordingly, the processor may previously know the distance 'd' of Equation 1. Also, when the terminal 865 receives a signal transmitted from the signal generation modules 861, 862, 863, and 864, the terminal 865 may know which point of the terminal 865 receives the signal transmitted from the signal generation modules 861, 862, 863, and 864 using a sensing unit. Accordingly, the processor may know the angles $\theta_1$ and $\theta_2$ of Equation 1 using information transmitted from the terminal 865. Accordingly, the processor may calculate the distance 'h' of Equation 1.

The processor calculates the distance 'h' between the signal generation modules 863 and 864 and the terminal 865 by using Equation 1. The processor may calculate a distance between the signal generation modules 861 and 862 and the terminal 865, a distance between the signal generation modules 861 and 863 and the terminal 865, a distance between the signal generation modules 862 and 864 and the terminal 865, and a distance between the signal generation modules 861 and 864 and the terminal 865 using Equation 1.

The processor may determine a location of the terminal 865 in the vehicle by combining the calculated distances.

Figure 9:
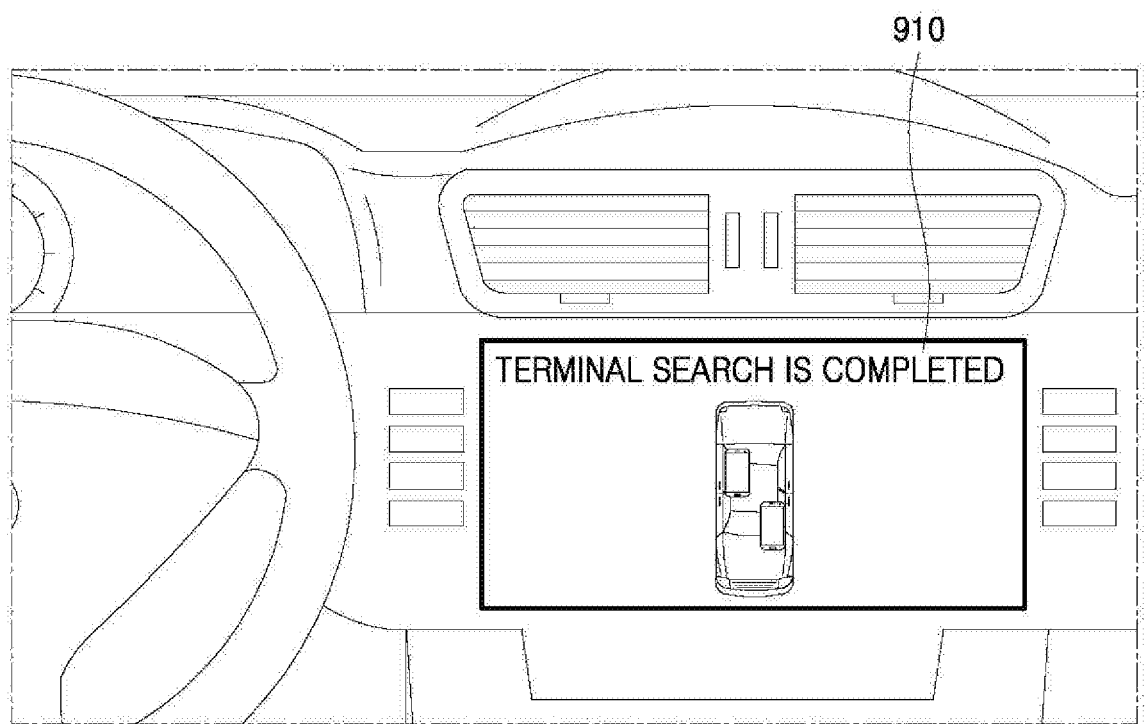
FIG. 9 is a diagram illustrating an example case where location information of a terminal is output to an apparatus including a processor according to an example embodiment.

FIG. 9 is a diagram illustrating an example case where location information of a terminal is output to an apparatus including a processor according to an example embodiment.

Referring to FIG. 9, a processor may output location information of a terminal (e.g., a terminal that is identified as located in a vehicle) through a screen 910 of an apparatus. For example, the processor may output, but is not limited to, an image showing a seat where the terminal is located in the vehicle. For example, the processor may output a voice indicating location information of the terminal through a speaker of the apparatus.

As described with reference to FIGS. 7 through 9, a processor may identify a location of a terminal in a vehicle. However, the various example embodiments are not limited thereto, and the terminal may identify a location in the vehicle and may transmit location information to an apparatus including the processor. An example where a terminal transmits location information of the terminal to an apparatus including a processor will now be explained in greater detail below with reference to FIG. 10.

Figure 10:
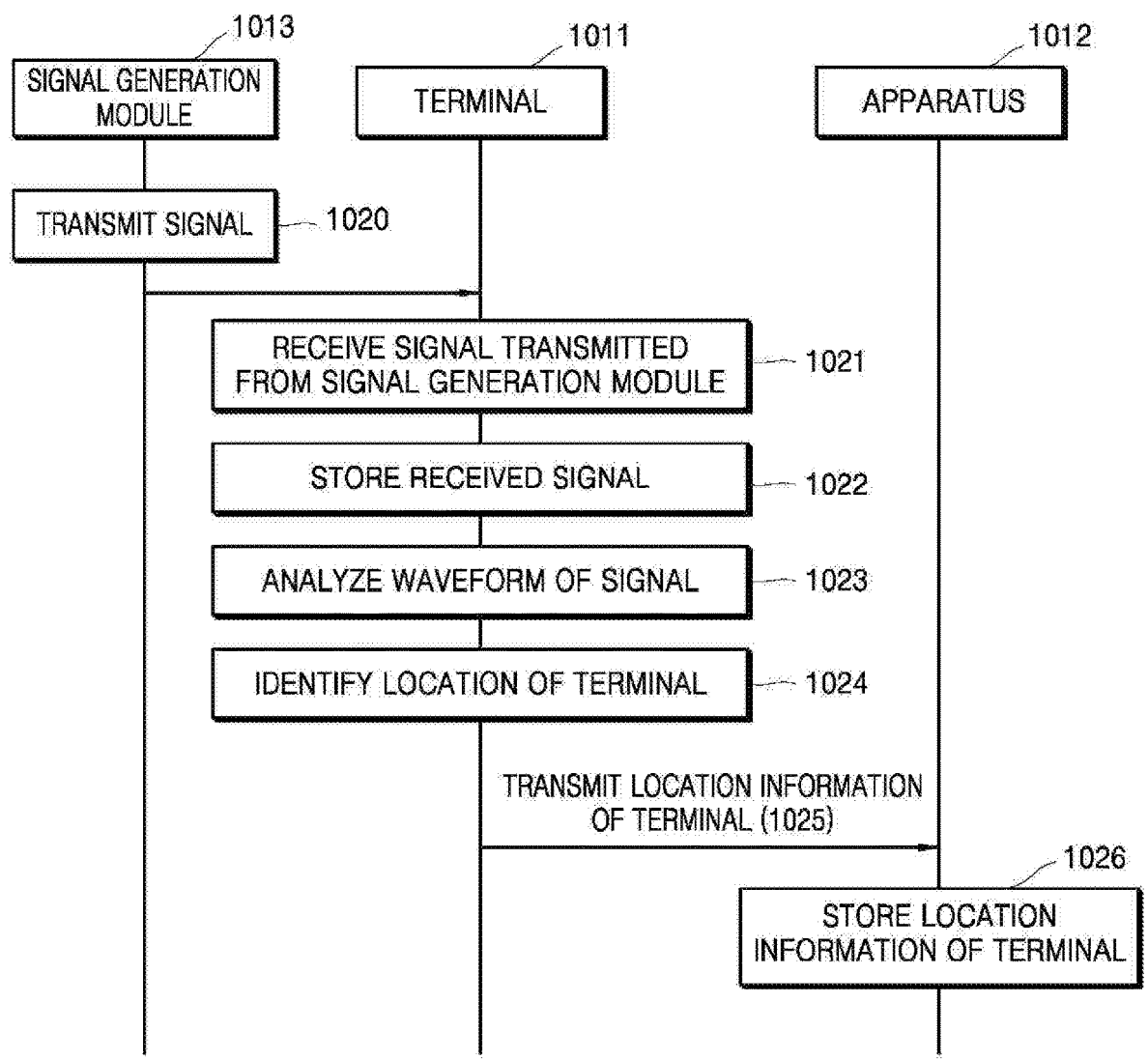
FIG. 10 is a flowchart illustrating an example case where a terminal transmits location information of a terminal to an apparatus according to an example embodiment.

FIG. 10 is a flowchart illustrating an example case where a terminal transmits location information of a terminal to an apparatus according to an example embodiment.

In FIG. 10, a terminal 1011 transmits location information of the terminal 1011 to an apparatus 1012 including a processor. Operations 1020 through 1022 of FIG. 10 are the same as or similar to operations 720 through 722 of FIG. 7, and thus a detailed explanation of operations 1020 through 1022 will not be repeated.

In operation 1023, the terminal 1011 analyzes a waveform of a received signal. For example, the terminal 1011 analyzes a waveform of the signal transmitted from a signal generation module 1013. For example, the module 1011 may receive the signal from the signal generation module 1013 for a predetermined period of time and may monitor how an intensity of the received signal changes.

In operation 1024, the terminal 1011 identifies a location of the terminal 1011. For example, the terminal 1011 identifies a location of the terminal 1011 in a vehicle using a result obtained after analyzing the waveform of the signal. For example, the terminal 1011 may identify which signal generation module transmits a signal with a highest intensity (e.g., a signal with a highest peak value) and may determine a seat adjacent to a door in which the identified signal generation module is installed as a location of the terminal. Alternatively, the terminal 1011 may identify a location of the terminal 1011 by using a triangulation method. A method performed by the terminal 1011 to identify a location of the terminal 1011 is the same as that described with reference to FIGS. 8A through 8C.

Also, the terminal 1011 may identify a location of another terminal in the vehicle. In detail, the terminal 1011 may analyze a waveform of a signal transmitted from the other terminal and may identify a location of the other terminal. Also, the terminal 1011 may identify a location of the terminal 1011 or a location of the other terminal by using a triangulation method.

In operation 1025, the terminal 1011 transmits location information of the terminal 1011 to the apparatus 1012. In other words, a communication unit of the terminal 1011 transmits information about the location of the terminal 1011 in the vehicle to the apparatus 1012.

In operation 1026, the apparatus 1012 stores the location information of the terminal 1011. For example, the processor of the apparatus 1012 may store the location information of the terminal in a memory.

The terminal 1011 may analyze a waveform of the signal transmitted from the terminal 1011 and may transmit a result (e.g., information indicating the waveform of the signal) obtained after analyzing the waveform of the signal to the apparatus 1012. The processor of the apparatus 1012 may identify a location of the terminal 1011 using the information received from the terminal 1011. An example where the processor of the apparatus 1012 identifies a location of the terminal 1011 by using the information received from the terminal 1011 will now be explained in greater detail below with reference to FIG. 11.

FIG. 11 is a flowchart illustrating an example case where a processor identifies a location of a terminal according to another example embodiment.

Operations 1120 through 1123 of FIG. 11 are the same as or similar to operations 1020 through 1023 of FIG. 10, and thus a detailed explanation of operations 1120 through 1123 will not be repeated.

In operation 1124, a terminal 1111 transmits information indicating a waveform of a signal to an apparatus 1112. For example, the terminal 1111 may monitor a change in an intensity of the signal according to a time and may transmit a monitoring result to the apparatus 1112.

For example, the terminal 1111 may generate a graph showing a relationship between an intensity of the signal and a time and may transmit information about the generated graph to the apparatus 1112. Alternatively, the terminal 1111 may transmit a peak value of the signal to the apparatus 1112. For example, the terminal 1111 may transmit information about the peak value of the signal and a signal generation module that transmits the signal to the apparatus 1112. Alternatively, the terminal 1111 may transmit information about a signal generation module showing the peak value to the apparatus 1112.

In operation 1125, the apparatus 1112 identifies a location of the terminal 1111. For example, a processor of the apparatus 1112 may identify a location of the terminal 1111 using the information transmitted from the terminal 1111. For example, the processor may identify which signal generation module transmits a signal with a highest intensity (e.g., a signal with a highest peak value) and may determine a seat adjacent to a door in which the identified signal generation module is installed as a location of the terminal 1111.

Also, the apparatus 1112 may identify a location of the terminal 1111 using a triangulation method.

In operation 1126, the apparatus 1112 transmits location information of the terminal 1111 to the terminal 1111. In other words, a communication unit of the apparatus 1112 transmits information about the location of the terminal 1111 in a vehicle to the terminal 1111.

In operation 1127, the apparatus 1112 stores the location information of the terminal 1111. In detail, the processor of the apparatus 1112 may store the location information of the terminal 1111 in a memory.

As described with reference to FIGS. 6 through 11, the terminal 612, 711, 1011, or 1111 or the apparatus 613, 712, 1012, or 1112 analyzes a waveform of a signal transmitted from the signal generation module 611 or identifies a location of the terminal. However, the various example embodiments are not limited thereto. In other words, the signal generation module 611 may analyze a waveform of a signal transmitted from the signal generation module 611 or may identify a location of the terminal.

An example where the signal generation module 611 analyzes a waveform of a signal or identifies a location of a terminal will now be described in greater detail below with reference to FIGS. 12A through 12D.

FIGS. 12A, 12B, 12C and 12D are flowcharts illustrating an example case where a signal generation module operates according to various example embodiments.

In FIGS. 12A through 12D, it is assumed that at least one of a plurality of signal generation modules installed in a vehicle is activated.

Figure 12A:
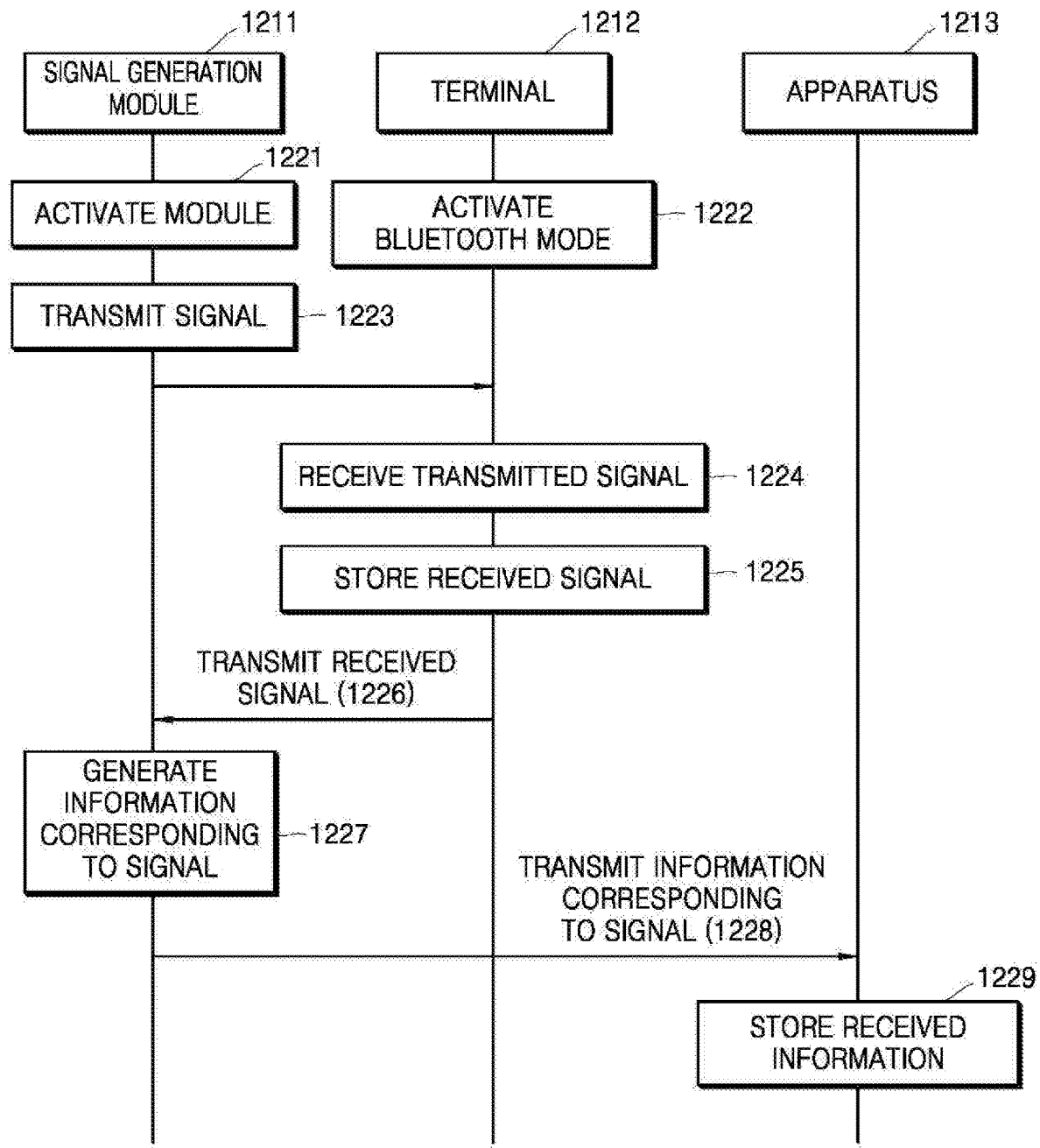

In FIG. 12A, a signal generation module 1211 transmits a signal, a terminal 1212 receives the signal from the signal generation module 1211, and the signal generation module 1211 receives the signal from the terminal 1212 and generates information corresponding to the received signal.

Operations 1221 through 1225 of FIG. 12A are the same as, or similar to, operations 621 through 625 of FIG. 6, and thus a detailed explanation of operations 1221 through 1225 will not be repeated.

In operation 1226, a terminal 1212 transmits a received signal to a signal generation module 1211. For example, when a signal generation module other than the signal generation module 1211 is activated, the terminal 1212 may map ID information of the signal generation module that transmits a signal and the signal transmitted from the signal generation module and may transmit a mapping result to the signal generation module 1211. Alternatively, when only the signal generation module 1211 is activated, the terminal 121 may notify the signal generation module 1211 that only a signal of the signal generation module 1211 is received.

In operation 1227, the signal generation module 1211 generates information corresponding to the signal. In operation 1228, the signal generation module 1211 transmits the information corresponding to the signal to an apparatus 1213. Examples of the information corresponding to the signal may include the signal transmitted from the signal generation module 1211, information indicating a waveform of the signal transmitted from the signal generation module 1211, ID information of the signal generation module 1211, location information of the signal generation module 1211, and ID information of a door in which the signal generation module 1211 is mounted.

For example, the signal generation module 1211 may directly transmit the signal received by the terminal 1212 to the apparatus 1213, or may transmit information indicating an intensity of the signal received by the terminal 1212 to the apparatus 1213.

In operation 1229, the apparatus 1213 stores the received information. In detail, a communication unit of the apparatus 1213 may receive the information from the signal generation module 1211 and a processor of the apparatus 1213 may store the received information.

Figure 12B:
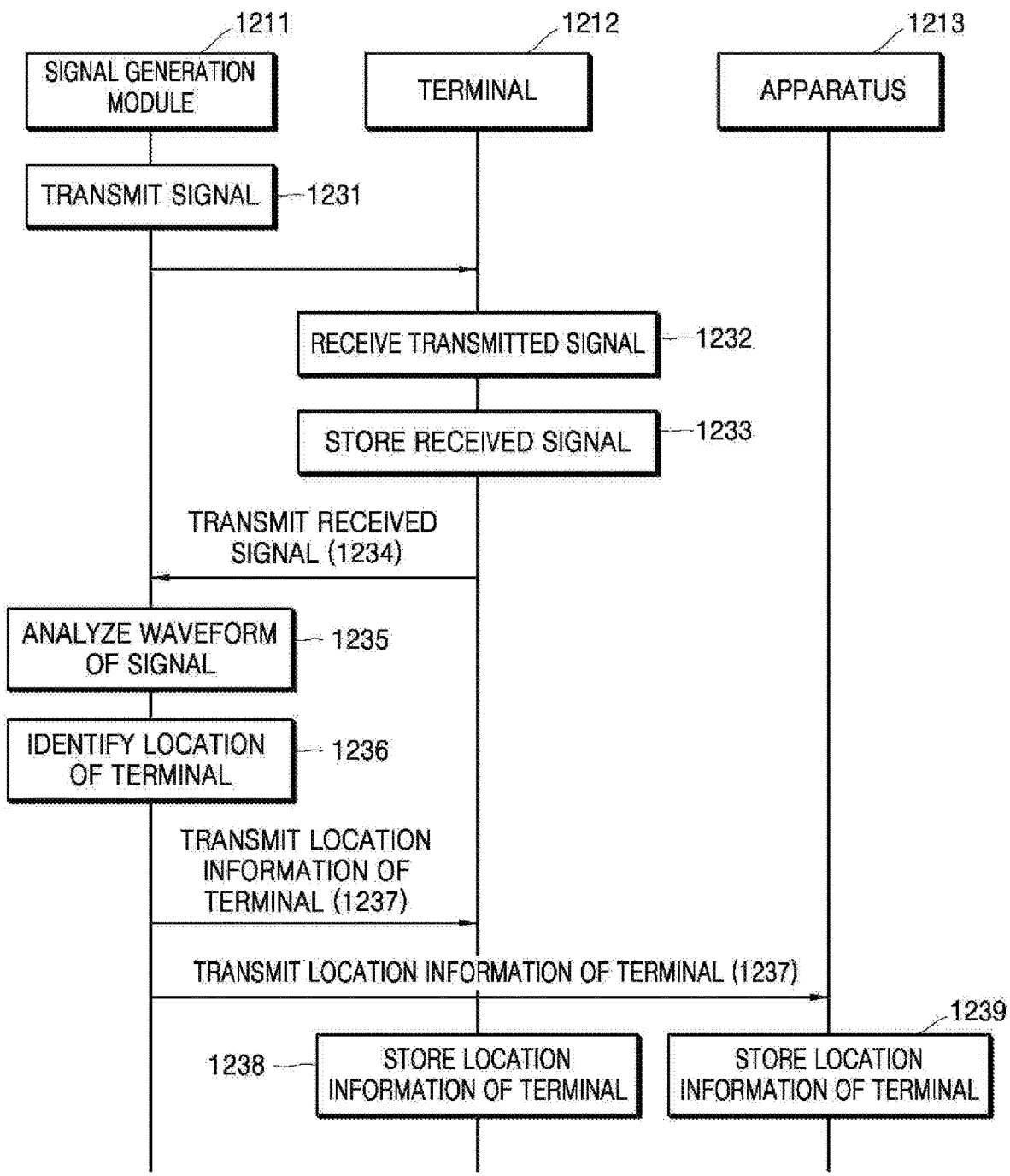

In FIG. 12B, the signal generation module 1211 analyzes a waveform of a signal and identifies a location of the terminal 1212.

Operations 1231 through 1233 of FIG. 12B are the same as, or similar to, operations 720 through 722 of FIG. 7, and thus a detailed explanation of operations 1231 through 1233 will not be repeated.

In operation 1234, the terminal 1212 transmits a received signal to the signal generation module 1211.

In operation 1235, the signal generation module 1211 analyzes a waveform of the signal. In detail, the signal generation module 1211 analyzes a waveform of the signal transmitted from the terminal 1212. For example, the signal generation module 1211 may receive the signal from the terminal 1212 for a predetermined period of time and may monitor how an intensity of the received signal changes.

In operation 1236, the signal generation module 1211 identifies a location of the terminal 1212. For example, the signal generation module 1211 may identify a location of the terminal 1212 in a vehicle using a result obtained after analyzing the waveform of the signal. For example, the processor may identify which signal generation module transmits a signal with a highest intensity (e.g., a signal with a highest peak value) and may determine a seat adjacent to a door in which the identified signal generation module is installed as a location of the terminal 1212. Alternatively, the signal generation module 1211 may identify a location of the terminal 1212 using a triangulation method. For example, when a plurality of signal generation modules are activated, the signal generation module 1211 may calculate a distance between each of the activated signal generation modules and the terminal 1212 using a distance between the activated signal generation modules and an angle between the terminal and each of the activated signal generation modules. Accordingly, the signal generation module 1211 may identify a location of the terminal 1212 in the vehicle by combining the calculated distances. A method performed by the signal generation module 1211 to identify a location of the terminal 1212 is the same as that described with reference to FIGS. 8A through 8C.

In operation 1237, the signal generation module 1211 transmits location information of the terminal 1212 to the terminal 1212 and/or the apparatus 1213. In other words, the signal generation module 1211 transmits information about the location of the terminal 1212 in the vehicle to the terminal 1212 and/or the apparatus 1213. However, according to the setting of the signal generation module 1211, the location information of the terminal 1212 may not be transmitted to the terminal 1212.

In operations 1238 and 1239, the terminal 1212 and the apparatus 1213 store the location information of the terminal 1212. For example, the processor of the apparatus 1213 may store the location information of the terminal 1212 in a memory. However, when the signal generation module 1211 does not transmit the location information of the terminal 1212 to the terminal 1212 in operation 1237, operation 1238 is not performed.

In FIG. 12C, the signal generation module 1211 analyzes a waveform of a signal and the terminal 1212 identifies a location of the terminal 1212.

Operations 1241 through 1245 of FIG. 12C are the same as, or similar to, operations 1231 through 1235 of FIG. 12B, and thus a detailed explanation of operations 1241 through 1245 will not be repeated.

In operation 1246, the signal generation module 1211 transmits information indicating a waveform to the terminal 1212. In operation 1247 the terminal 1212 identifies a location of the terminal 1212. For example, the terminal 1212 identifies a location of the terminal 1212 in the vehicle using a result obtained after analyzing a waveform of a signal. For example, the terminal 1212 may identify which signal generation module transmits a signal with a highest intensity (e.g., a signal with a highest peak value) and may determine a seat adjacent to a door in which the identified signal generation module is installed as a location of the terminal 1212. Alternatively, the terminal 1212 may identify a location of the terminal 1212 using a triangulation method. A method performed by the terminal 1212 to identify a location of the terminal 12112 is the same as, or similar to, that described with reference to FIGS. 8A through 8C.

Also, the terminal 1212 may identify a location of another terminal in the vehicle. In detail, the terminal 1211 may analyze a waveform of a signal transmitted from the other terminal and may identify a location of the other terminal. Also, the terminal 1212 may identify a location of the terminal 1212 or a location of the other terminal by using a triangulation method.

In operation 1248, the terminal 1212 transmits location information of the terminal 1212 to the apparatus 1213. In other words, a communication unit of the terminal 1212 transmits information about the location of the terminal 1212 in the vehicle to the apparatus 1213.

In operation 1249, the apparatus 1213 stores the location information of the terminal 1212. For example, the processor of the apparatus 1213 may store the location information of the terminal 1212 in a memory.

Figure 12D:
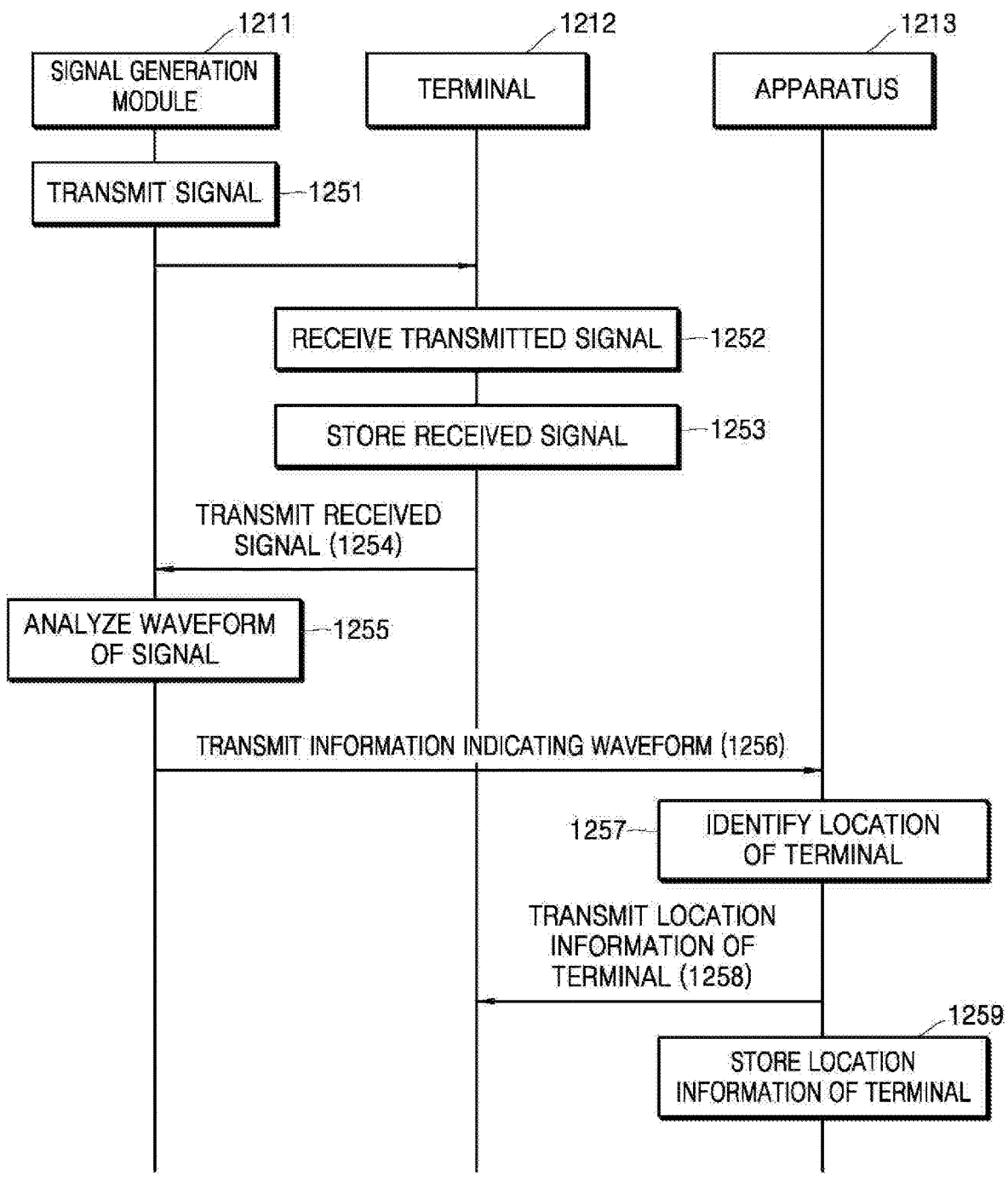

In FIG. 12D, the signal generation module 1211 analyzes a waveform of a signal and the apparatus 1213 identifies a location of the terminal 1212.

Operations 1251 through 1255 of FIG. 12D are the same as, or similar to, operations 1231 through 1235 of FIG. 12B, and thus a detailed explanation of operations 1251 through 1255 will not be repeated.

In operation 1256, the signal generation module 1211 transmits information indicating a waveform of a signal to the apparatus 1213. For example, the signal generation module 1211 may monitor a change in an intensity of the signal according to a time and may transmit a monitoring result to the apparatus 1213.

For example, the signal generation module 1211 may generate a graph showing a relationship between an intensity of the signal and a time and may transmit information about the generated graph to the apparatus 1213. Alternatively, the signal generation module 1211 may transmit a peak value of the signal to the apparatus 1213. For example, the signal generation module 1211 may transmit information about the peak value of the signal and a signal generation module that transmits the signal to the apparatus 1213. Alternatively, the signal generation module 1211 may transmit information about a signal generation module indicating the peak value to the apparatus 1213.

In operation 1257, the apparatus 1213 identifies a location of the terminal 1212. For example, the processor of the apparatus 1213 may identify a location of the terminal 1212 using the information transmitted from the terminal 1212. For example, the processor may identify which signal generation module transmits a signal with a highest intensity (e.g., a signal with a highest peak value) and may determine a seat adjacent to a door in which the identified signal generation module is installed as a location of the terminal 1212. Alternatively, the apparatus 1212 may identify a location of the terminal 1212 using a triangulation method. A method performed by the processor to identify a location of the terminal 1212 is the same as, or similar to, that described with reference to FIGS. 8A through 8C.

In operation 1258, the apparatus 1213 transmits location information of the terminal 1212 to the terminal 1212. In operation 1259, the terminal 1212 stores the location information of the terminal 1212. However, according to the setting of the apparatus 1213, operations 1258 and 1259 may not be performed.

When a plurality of terminals are located in the vehicle, the processor may set authorization levels of the terminals. In this case, the processor may differently set the authorization levels based on locations of the terminals. For example, the processor may set the authorization levels so that an authorization level of a terminal located in a driver's seat is different from an authorization level of a terminal located at a position other than the driver's seat.

An example where a processor sets authorization levels of terminals according to locations of the terminals will now be explained in greater detail below with reference to FIG. 13.

Figure 13:
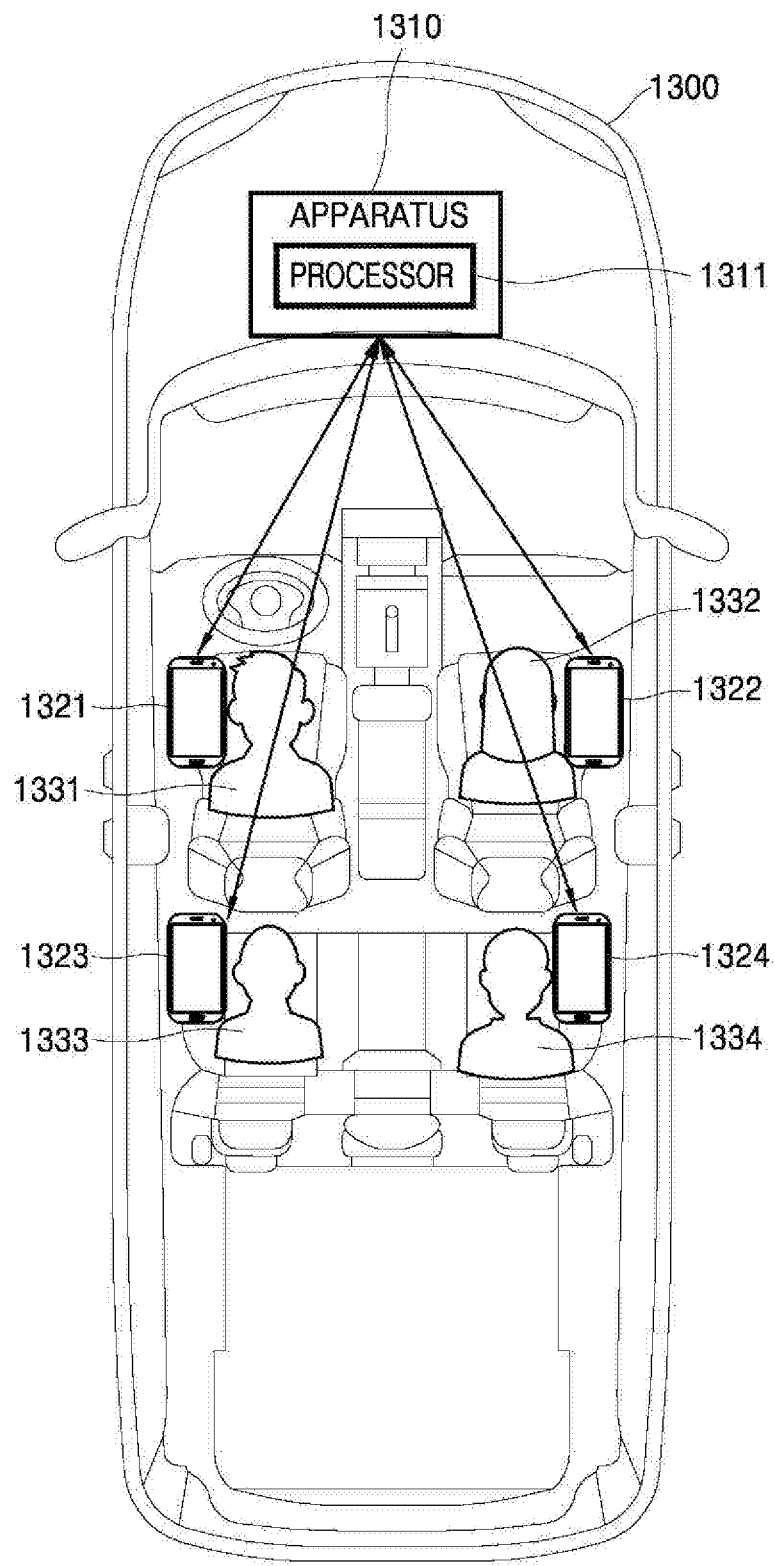
FIG. 13 is a diagram illustrating an example case where a processor sets authorization levels of terminals according to an example embodiment.

FIG. 13 is a diagram illustrating an example case where a processor sets the authorization levels of the terminals according to an example embodiment.

FIG. 13 illustrates an apparatus 1310 included in a vehicle 1300 and a plurality of terminals, e.g., first through fourth terminals 1321, 1322, 1323, and 1324. The apparatus 1310 may be a CID apparatus of the vehicle 1300, or may be a computing device that may be additionally installed in the vehicle 1300. Also, the first through fourth terminals 1321, 1322, 1323, and 1324 may be terminals owned by a driver 1331 and passengers 1332, 1333, and 1334. Although four riders of the vehicle 1300 are illustrated in FIG. 13 for convenience of explanation, the various example embodiments are not limited thereto. In other words, only the driver 1331 may get in the vehicle 1300 and the number of passengers is not limited to 3.

A processor 1311 may set authorization levels of the first through fourth terminals 1321, 1322, 1323, and 1324 and may request some of the first through fourth terminals 1321, 1322, 1323, and 1324 to perform a task based on the authorization levels. In other words, the processor 1311 may allocate a task corresponding to the authorization level of the first terminal 1321 to the first terminal 1321. The term 'authorization level' used herein refers to a level indicating whether to access data stored in the vehicle 1300.

For example, the processor 1311 may allocate a high authorization level to the first terminal 1321 that is located in a driver's seat, and may allocate low authorization levels to the second through fourth terminals 1322, 1323, and 1324 that are located in passenger seats. Also, the processor 1311 may set that only the first terminal 1321 to which the high authorization level is allocated may access the data stored in the vehicle 1300.

For example, the vehicle 1300 may store image signals generated by a camera of the vehicle 1300 in a memory. The processor 1311 may provide the image signals to only a terminal with a high authorization level from among the first through fourth terminals 1321, 1322, 1323, and 1324 or may allow the terminal to read the image signals from the memory of the vehicle 1300.

Hereinafter, an authorization level indicating that the data stored in the memory of the vehicle 1300 may be accessed is referred to as a 'level 1' and an authorization level indicating that the data stored in the memory of the vehicle 1300 may not be accessed is referred to as a 'level 2'.

The processor 1311 may partition a system resource of a computing system (e.g., a CID system) of the apparatus 1310 into virtual zones and may set that a terminal may access only a specific virtual zone from among the virtual zones according to an authorization level of the terminal. The term 'system resource' used herein refers to hardware or software such as a processor, a memory, or a storage included in the computing system. Also, the term 'virtual zone' used herein refers to a part of partitioned hardware or software. For example, the virtual zone may be a part of storage capacity of a memory or a storage or a part of maximum computing power of a processor.

The processor 1311 may designate virtual zones that may be accessed according to authorization levels. For example, the processor 1311 may partition a system resource of the apparatus 1310 into a zone 1 and a zone 2 and may set that a terminal to which the level 1 is allocated may access the zone 1 and the zone 2 and a terminal to which the level 2 is allocated may access only the zone 2. Accordingly, the terminal to which the level 1 is allocated may perform tasks corresponding to the zone 1 and the zone 2, and the terminal to which the level 2 is allocated may perform tasks corresponding to the zone 2. In other words, the processor 1311 may designate virtual zones that may be accessed according to authorization levels of the first through fourth terminals 1321, 1322, 1323, and 1324 using virtualization. Also, according to a user's selection, virtual zones that may be accessed by each of the first through fourth terminals 1321, 1322, 1323, and 1324 may be set. For example, the user may set that the terminal to which the level 1 is allocated may access only the zone 1 and the terminal to which the level 2 is allocated may access only the zone 2. Accordingly, the security of data stored in the vehicle 1300 may be further improved.

According to a type of a task, the processor 1311 may request only a terminal to which the level 1 is allocated from among the first through fourth terminals 1321, 1322, 1323, and 1324 to perform the task or may request all terminals to perform the task. Also, when there exist a plurality of terminals that are to be requested to perform a task, the processor 1311 may request to perform the task according to an order determined among the terminals. Also, the processor 1311 may distribute tasks to be performed to the terminals. Also, the processor 1311 may request all or some of the first through fourth terminals 1321, 1322, 1323, and 1324 to perform a task in consideration of available resources of the first through fourth terminals 1321, 1322, 1323, and 1324.

Also, according to the user's selection, authorization levels of the first through fourth terminals 1321, 1322, 1323, and 1324 may be changed. For example, the user may allocate authorization that may access a virtual zone (e.g., the zone 1 or the zone 2) to each of the first through fourth terminals 1321, 1322, 1323, and 1324, and an authorization level of each of the first through fourth terminals 1321, 1322, 1323, and 1324 may be changed according to the authorization allocated by the user.

Also, according to the user's selection, a priority determined among the first through fourth terminals 1321, 1322, 1323, and 1324 may be changed. For example, even when the processor 1311 determines that a task is requested in an order from the first terminal 1321 to the second terminal 1322, the user may change a priority so that a task is requested in an order from the second terminal 1322 to the first terminal 1321.

The vehicle 1300 performs various operations. For example, the vehicle 1300 may travel or stop, may operate a wiper, or may operate an air conditioning apparatus. Also, a CID apparatus of the vehicle 1300 may display images (e.g., still images or moving images) obtained by the camera installed in the vehicle 130 or may execute a navigation program. Also, the CID apparatus may reproduce various content (e.g., music or images) downloaded from the outside.

According to an available resource of the apparatus 1310, types of operations performed by the vehicle 1300 may be limited or operations of the vehicle 1300 may not be smoothly performed. The available resource may correspond to a speed at which data is calculated, the amount of processed data, a speed at which data is downloaded, a data storage space, or idle power. For example, according to a specification of hardware and/or software of the CID apparatus, the CID apparatus may only display images obtained by the camera of the vehicle 1300 and may not analyze the images or may provide various effects to the images. Also, the CID apparatus may not rapidly download a large amount of content.

The processor 1311 may enable the vehicle 1300 to perform an operation by using available resources of the first through fourth terminals 1321, 1322, 1323, and 1324. In other words, the processor 1311 may allow the first through fourth terminals 1321, 1322, 1323, and 1324 and the apparatus 1310 to communicate with each other and may request at least one from among the first through fourth terminals 1321, 1322, 1323, and 1324 to perform a task. The term 'task' used herein may refer, for example, to a specific piece of work required by the vehicle 1300 to perform an operation. For example, when it is assumed that the operation is to display an image obtained by the camera of the vehicle 1300, the task may be a specific piece of work of generating a still image file or a moving image file by processing image signals. Alternatively, when it is assumed that the operation is to reproduce content, the task may be a specific piece of work of downloading the content from the outside.

Also, the processor 1311 may set an authorization level of the first terminal 1321 in consideration of an available resource of the first terminal 1321 as well as a location of the first terminal 1321.

For example, after the processor 1311 sets authorization levels according to locations of the first through fourth terminals 1321, 1322, 1323, and 1324, the apparatus 1310 may receive information about available resources from the first through fourth terminals 1321, 1322, 1323, and 1324. The available resources may correspond to a speed at which data is calculated, the amount of processed data, a speed at which data is downloaded, a data storage space, or idle power.

For example, the processor 1311 may request the first terminal 1321 to transmit information about an available resource and the first terminal 1321 may transmit the information about the available resource to the apparatus 1310 by referring to a specification about hardware/software of the first terminal 1321.

The processor 1311 may change the authorization levels that are previously set in consideration of the available resources of the first through fourth terminals 1321, 1322, 1323, and 1324. For example, the processor 1311 may set an authorization level of the first terminal 1321 to the level 1 based on a location of the first terminal 1321, and then when it is determined that an available resource of the first terminal 1321 is not sufficient to perform a task, the processor 1311 may change the authorization level of the first terminal 1321 to the level 2.

Figure 14:
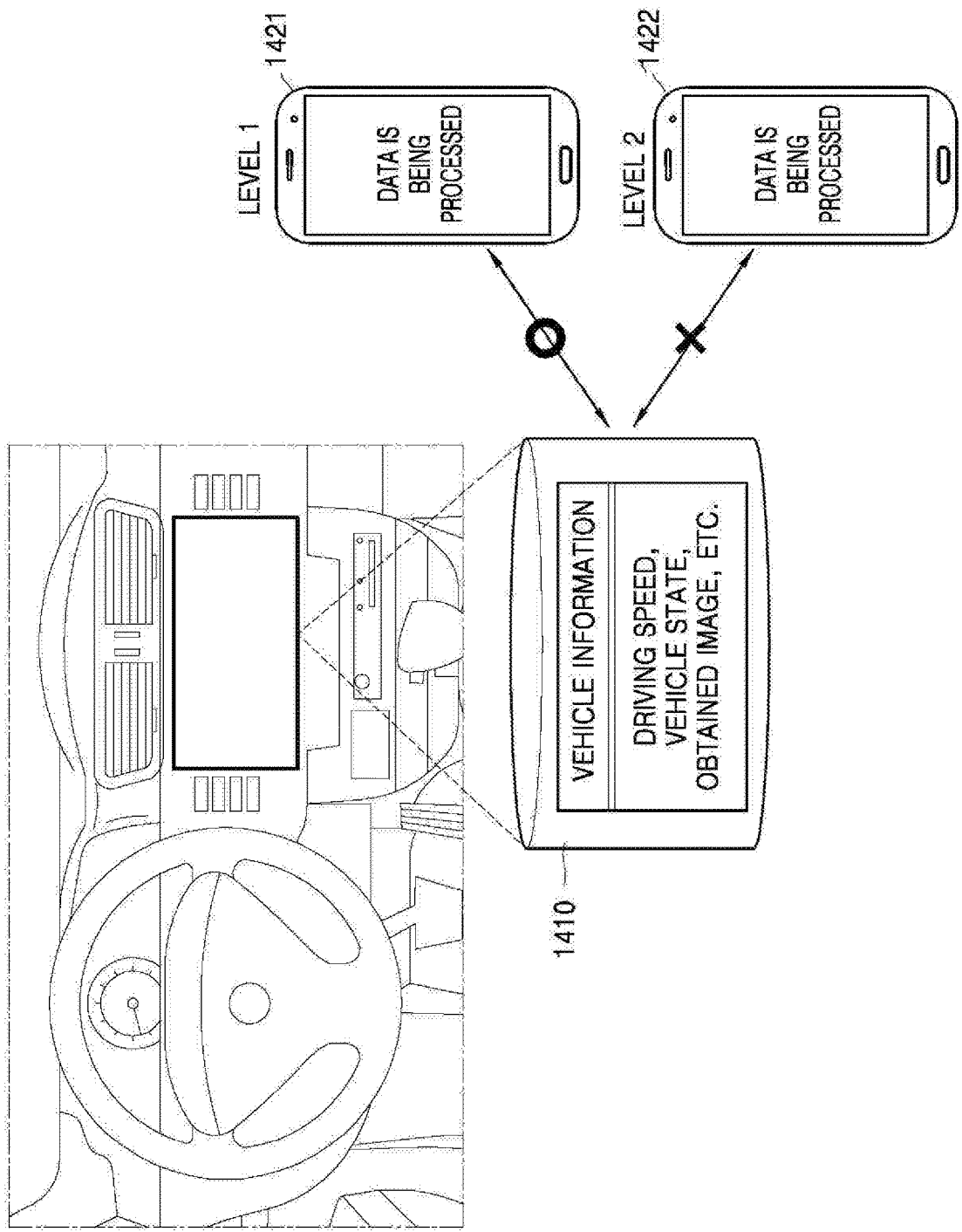
FIG. 14 is a diagram illustrating an example in which a terminal may access data stored in a vehicle according to an example embodiment.

FIG. 14 is a diagram illustrating an example in which a terminal may access data stored in a vehicle according to an example embodiment.

In FIG. 14, data is stored in a memory 1410 of a vehicle. The memory 1410 may store data generated as the vehicle performs an operation. For example, when the vehicle travels, the memory 1410 may store a speed or a revolutions per minute (RPM) value of the vehicle. Also, the memory 1410 may store information about an internal temperature or a humidity of the vehicle. Also, the memory 1410 may store image signals generated by a camera of the vehicle, and may store a program needed to drive various devices embedded in the vehicle. Also, the memory 1410 may store various content downloaded from the outside. Data stored in the memory 1410 is not limited thereto, and any data generated as the vehicle performs various operations may be stored in the memory 1410.

Terminals 1421 and 1422 may or may not access the data stored in the memory 1410 based on authorization levels. For example, when it is assumed that the authorization level of the terminal 1421 is the level 1, the terminal 1421 may access the data stored in the memory 1410. When it is assumed that the authorization level of the terminal 1422 is the level 2, the terminal 1422 may not access the data stored in the memory 1410.

A task that may be performed may be mapped to each authorization level and stored in the memory 1410 of the vehicle. A case where an authorization level and a task are mapped to each other and stored will now be explained in greater detail below with reference to FIG. 15.

Figure 15:
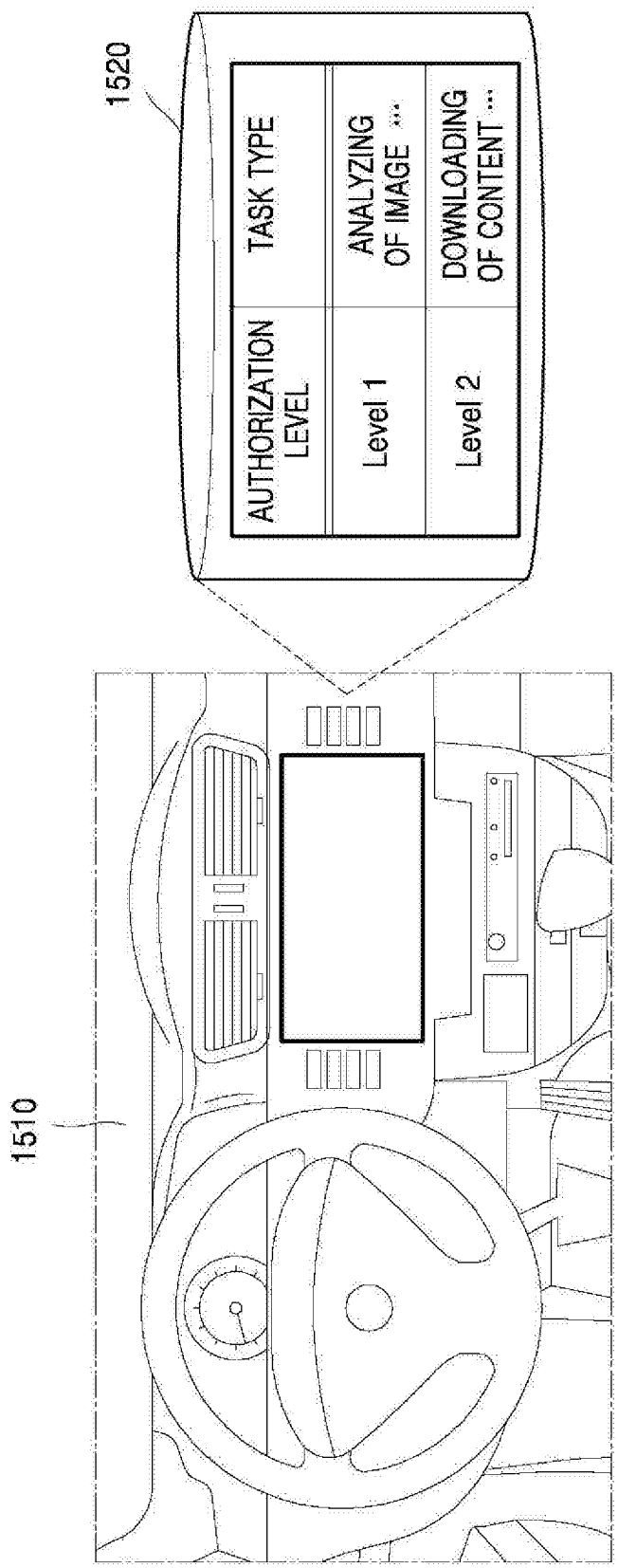
FIG. 15 is a diagram illustrating an example case where an authorization level and a task are mapped to each other and are stored according to an example embodiment.

FIG. 15 is a diagram illustrating an example case where an authorization level and a task are mapped to each other and are stored according to an example embodiment.

FIG. 15 illustrates data stored in a memory 1520 of a vehicle 1510. For example, tasks that may be performed by a terminal having the level 1 and tasks that may be performed by a terminal having the level 2 may be classified and stored in the memory 1520. Criteria for classifying tasks may be whether the data stored in the memory 1520 is needed to perform the tasks.

For example, tasks such as a task of generating an image, a task of analyzing an image, and a task of processing an image may be classified as ones that may be performed by the terminal having the level 1. In detail, image signals generated by a camera of the vehicle 1510 may be stored in the memory 1520. In this case, in order to generate an image, the image signals stored in the memory 1520 have to be used. Accordingly, a processor may provide the image signals only to the terminal having the level 1 or may allow the terminal to read the image signals from the memory 1520.

Alternatively, tasks such as a task of downloading content may be sorted as ones that may be performed by the terminal having the level 2. The task of downloading content requires only to download content and transmit the content to the vehicle 1510 without access to the data stored in the memory 1520. Accordingly, the processor may previously set the terminal having the level 2 to perform the task of downloading content.

The tasks corresponding to the level 2 may be previously set to be performed also by the terminal having the level 1.

Also, an authorization level of each terminal may be stored in the memory 1520. In other words, the processor may set an authorization level of each terminal according to a location of the terminal and/or an available resource of the terminal and may store the authorization level of the terminal in the memory 1520.

Figure 16:
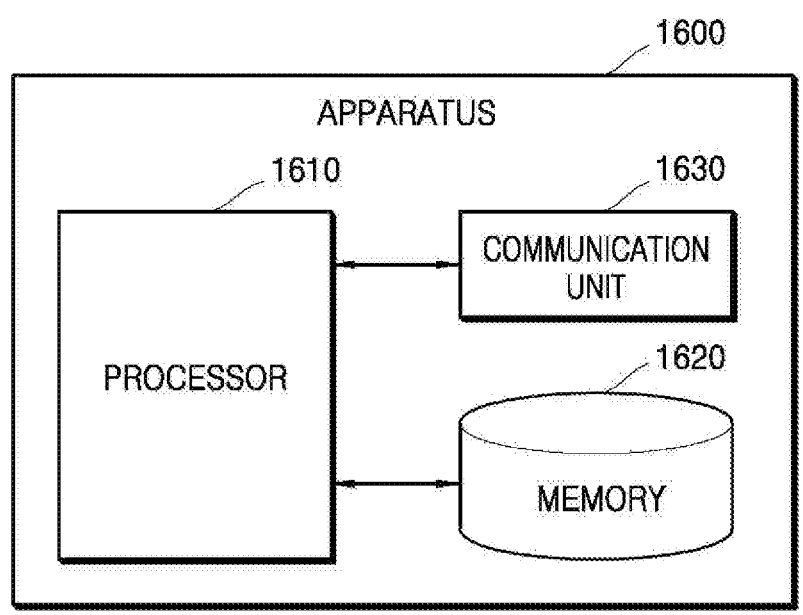
FIGS. 16 and 17 are block diagrams illustrating example vehicle driving assistance apparatuses including processors according to various example embodiments.
Figure 17:
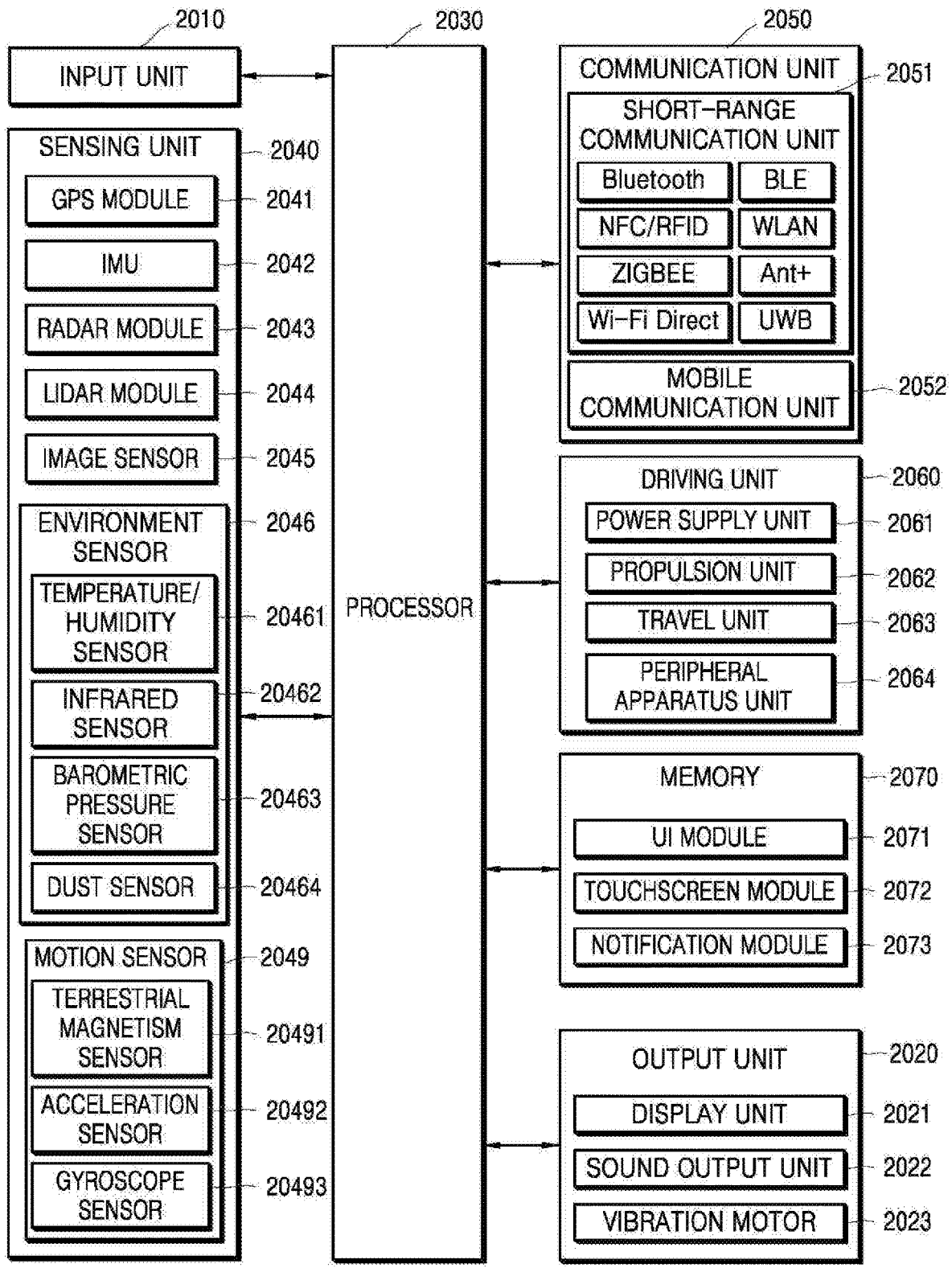

FIGS. 16 and 17 are diagrams illustrating example vehicle driving assistance apparatuses (hereinafter, referred to as 'apparatuses') including processors according to various example embodiments.

Referring to FIG. 16, an apparatus 1600 includes a processor (e.g., including processing circuitry) 1610, a memory 1620, and a communication unit (e.g., including communication circuitry) 1630. For example, the apparatus 1600 may be a CID apparatus of a vehicle or a computing device that may be additionally installed in the vehicle. If the apparatus 1600 is a computing device that may be additionally installed in the vehicle, the apparatus 1600 may transmit/receive data by being connected to a CID apparatus by wire or wirelessly, and information generated by the apparatus 1600 may be output through an output unit of the CID apparatus.

However, all of elements illustrated in FIG. 16 are not essential elements of the apparatus 1600. The apparatus 1600 may include elements more than those illustrated in FIG. 16 or may include elements fewer than those illustrated in FIG. 16.

For example, as illustrated in FIG. 17, an apparatus 2000 may further include an input unit (e.g., including input circuitry) 2010, a sensing unit 2040, a driving unit 2060, and an output unit (e.g., including output circuitry) 2020 in addition to a processor 2030, a communication unit 20540, and a memory 2070.

The input unit 2010 may include various input circuitry through which a user inputs data for controlling the apparatus 2000. The input unit 2010 may include various input circuitry, such as, for example, and without limitation, a key pad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jog switch.

The input unit 2010 may receive a user input for requesting a response message to a voice input of the user and executing an operation related to the response message.

The output unit 2020 may output an audio signal, a video signal, or a vibration signal. The output unit 2020 may include various output circuitry, such as, for example, and without limitation, at least one of a display unit 2021, a sound output unit (e.g., including sound output circuitry) 2022, and a vibration motor 2023.

The display unit 2021 displays and outputs information processed by the apparatus 2000. For example, the display unit 2021 may include a display and display a user interface for requesting a response message to a voice input of the user and executing an operation related to the response message. Also, the display unit 2021 may display a three-dimensional (3D) image showing a surrounding environment of the vehicle.

The sound output unit 2022 may include various circuitry that outputs audio data received from the communication unit 2050 or stored in the memory 2070. Also, the sound output unit 2022 outputs a sound signal (e.g., a call signal receiving sound, a message receiving sound, or a notification sound) related to a function performed by the apparatus 2000.

The processor 2030 may include various processing circuitry and controls an overall operation of the apparatus 2000. For example, the processor 2030 may control the input unit 2010, the output unit 2020, the sensing unit 2040, the communication unit 2050, and the driving unit 2060 by executing programs stored in the memory 2070. Also, the processor 2030 may perform the functions described with reference to FIGS. 1 through 15 by executing the programs stored in the memory 2070. For example, the processor 2030 may be a micro controller unit (MCU). Also, the processor 2030 may perform a function of a cognitive processor.

For example, the processor 2030 may identify a location of a terminal in a vehicle by using information received from the terminal. For example, the processor 2030 may identify a location of the terminal by analyzing a waveform of a signal included in the information received from the terminal.

Also, when there exist a plurality of terminals that are located in the vehicle and thus whose locations are identified, the processor 2030 may set authorization levels of the plurality of terminals. Also, the processor 2030 may set authorization levels of the terminals in consideration of available resources of the terminals as well as locations of the terminals. Also, the processor 2030 may allocate tasks corresponding to the authorization levels to the terminals.

The sensing unit 2040 may detect a state of the apparatus 2000 and may transmit information about the detected state to the processor 2030. Also, the sensing unit 2040 may be used to obtain or generate context information indicating a condition (e.g., whether an object exists) around the vehicle or the user.

The sensing unit 2040 may include various sensors and/or sensing circuitry, such as, for example, and without limitation, at least one from among a global positioning system (GPS) module 2041, an inertial measurement unit (IMU) 2042, a Radar module 2043, a Lidar module 2044, an image sensor 2045, an environment sensor 2046, including, for example, and without limitation, a temperature/humidity sensor 20461, an infrared sensor 20462, a barometric pressure sensor 20463, a dust sensor 20464, or additional sensors not shown, such as a proximity sensor, an RGB sensor (e.g., an illuminance sensor), and a motion sensor 2049, including, for example, and without limitation, a terrestrial magnetism sensor 20491, an acceleration sensor 20492, a gyroscope sensor 20493, or the like. Functions of elements included in the sensing unit 2040 would have been intuitively found by one of ordinary skill in the art from their names, and thus a detailed explanation of the functions of the elements will not be given.

The GPS module 2041 may be used to estimate a geographical location of the vehicle. In other words, the GPS module 2041 may include a transceiver configured to estimate a location of the vehicle on the earth.

The IMU 2042 may be used to detect a location of the vehicle and orientation changes based on inertial acceleration. For example, the IMU 2042 may include accelerometers and gyroscopes.

The Radar module 2043 may be used to detect objects in an environment around the vehicle using a wireless signal. Also, the Radar module 2043 may detect speeds and/or directions of the objects.

The Lidar module 2044 may be used to detect objects in an environment around of the vehicle by using laser light. For example, the Lidar module 2044 may include a laser light source and/or a laser scanner configured to emit laser light and a detector configured to detect reflected laser light. The Lidar module 2044 may be configured to operate in a coherent (e.g., used to detect heterodyne) or incoherent detection mode.

The image sensor 2045 may include a camera used to generate images showing the inside and the outside of the vehicle. Examples of the camera may include, but are not limited to, a mono camera, a stereo camera, an infrared camera, and a thermal camera. The mage sensor 2045 may include a plurality of cameras, and the plurality of cameras may be located at a plurality of positions inside and outside the vehicle.

The environment sensor 2046 may be used to detect an external environment of the vehicle including weather. For example, the environment sensor 2046 may include a temperature/humidity sensor 20461, an infrared sensor 20462, a barometric pressure sensor 20463, and a dust sensor 20464.

The motion sensor 2046 may be used to sense a motion of the vehicle. For example, the motion sensor 2049 may include a terrestrial magnetism sensor 20491, an acceleration sensor 20492, and a gyroscope sensor 20493.

The communication unit 2050 may include various communication circuitry included in one or more elements through which the apparatus 2000 communicates with another apparatus, an external apparatus, or an external server. The external apparatus may be, but is not limited to, a computing apparatus or a sensor apparatus. For example, the communication unit 2050 may include various communication circuitry, such as, for example, and without limitation, at least one from among a short-range communication unit 2051 and a mobile communication unit 2052. The communication unit may additionally include, although not shown, a broadcast receiving unit.

The short-range communication unit 2051 may include various short-range communication circuitry, such as, for example, and without limitation, a Bluetooth communication unit, a BLE communication unit, a near field communication unit (NFC/RFID), a WLAN (WiFi) communication unit, a Zigbee communication unit, an infrared data association (IrDA) communication unit, a Wi-Fi direct (WFD) communication unit, and an ultra wideband (UWB) communication unit.

The mobile communication unit 2052 transmits/receives a wireless signal to/from at least one from among a base station, an external terminal, and a server via a mobile communication network. Examples of the wireless signal may include a voice call signal, a video call signal, or any of various data according to text/multimedia message transmission/reception.

Also, the communication unit 205 may transmit/receive, to/from an external apparatus and an external server, information needed to request a response message to a voice input of the user and to perform an operation related to the response message.

The driving unit 2060 may include various elements used to drive the vehicle and operate apparatuses in the vehicle. The driving unit 2060 may include, for example, and without limitation, at least one from among, a power supply unit

2061, a propulsion unit 2062, a travel unit 2063, and a peripheral apparatus unit 2064.

The peripheral apparatus unit 2064 may include a navigation system, a headlight, a turn signal lamp, a wiper, an interior light, a heater, and an air conditioner.

The navigation system may be a system configured to determine a travel path of the vehicle. The navigation system may be configured to dynamically update a travel path while the vehicle travels. For example, the navigation system may use data collected by the GPS module 2041 in order to determine a travel path of the vehicle.

The memory 2070 may store a program for processing and controlling the processor 2030, and may store data transmitted to an external apparatus or an external server or received from the external apparatus or the external server.

The memory 2070 may include at least one type of storage medium from among a flash memory type, a hard disk type, a multimedia card micro type, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 2070 may be classified into a plurality of modules according to functions. For example, the memory 2070 may include at least one from among, but not limited to, a user interface (UI) module 2071, a touchscreen module 2072, and a notification module 2073.

The UI module 2071 may provide a specialized UI or a graphical user interface (GUI) that interoperates with the apparatus 2000 according to an application. The touchscreen module 2072 may detect a touch gesture of the user on a touchscreen and may transmit information about the touch gesture to the processor 2030. The touchscreen module 2072 according to an embodiment may recognize and analyze a touch code. The touchscreen module 2072 may include separate hardware including a controller.

The notification module 2073 may generate a signal for notifying an event occurring in the apparatus 2000. Examples of the event occurring in the apparatus 2000 include call signal reception, message reception, key signal input, and schedule notification. The notification module 2073 may output a notification signal as a video signal through the display unit 2021, may output a notification signal as an audio signal through the sound output unit 2022, or may output a notification signal as a vibration signal through the vibration motor 2023.

As described above, an apparatus may automatically identify a location of a terminal of a rider in a vehicle. Also, the apparatus may be automatically connected to the terminal without the rider's intervention. Accordingly, the apparatus may be wirelessly connected to the terminal without the rider's manipulation and may transmit/receive data to/from the terminal. Also, the apparatus may allocate a task to the terminal and may receive a result of the task from the terminal.

Also, when a plurality of terminals exist in the vehicle, the apparatus may identify locations of the plurality of terminals and may set authorization levels of the plurality of terminals. The apparatus may allocate tasks corresponding to the authorization levels of the terminals to the terminals.

The method can be realized as computer programs and can be implemented in general-use digital computers that execute the programs using a non-transitory computer-readable recording medium. Data structures used in the method may be recorded through various means on the computer-readable recording medium. Examples of the computer-readable recording medium include magnetic storage media (e.g., ROMs, RAMs, universal serial buses (USBs), floppy disks, and hard disks), optical recording media (e.g., compact disk (CD)-ROMs, or digital versatile disks (DVDs)), etc.

Also, the method may be performed by executing instructions included in at least one program from among programs maintained in a non-transitory computer-readable recording medium. When the instructions are executed by a computer, the at least one computer may perform a function corresponding to the instructions. The instructions may include not only machine codes created by a compiler but also high-end language codes that may be executed by the computer by using an interpreter. In the present disclosure, an example of the computer may be a processor and an example of the recording medium may be a memory.

While the present disclosure has been illustrated and described with reference to various example embodiments thereof, the example embodiments have merely been used to explain the present disclosure and should not be understood as limiting the scope of the present disclosure. The example embodiments should be considered in a descriptive sense only and not for purposes of limitation. Therefore, the scope of the present disclosure is defined not by the detailed description of the present disclosure but by the appended claims, and all differences within the scope will be understood as being included in the present disclosure.

What is claimed is:

1. An apparatus for identifying a location of a terminal, the apparatus comprising:
 a communication unit; and
 a processor configured to:
  in response to detecting a door opening/closing of a vehicle, activate a signal generating module which transmits a signal to the terminal;
  control to receive, via the communication unit, from the terminal, information corresponding to the signal transmitted to the terminal from the signal generation module;
  identify, based on the received information, one of a plurality of different locations in the vehicle as a location of the terminal, each location corresponding to an authorization level for accessing data stored in the vehicle and the authorization levels including a first authorization level and a second authorization level higher than the first authorization level, wherein the second authorization level authorizes access to both first and second data of the data stored in the vehicle and the first authorization level authorizes access to the first data, but not to the second data; and
  set, as an authorization level for the terminal, the authorization level associated with the identified location.

2. The apparatus of claim 1, wherein the signal generation module comprises a plurality of signal generation modules each respectively embedded in a corresponding one of a plurality of doors of the vehicle,
 wherein signal generation modules embedded in doors that are opened/closed are activated, from among the signal generation modules embedded in the plurality of doors.

3. The apparatus of claim 1, wherein the communication unit is configured to receive a signal corresponding to the transmitted signal.

4. The apparatus of claim 1, wherein the communication unit is configured to receive information indicative of a waveform of the transmitted signal.

5. The apparatus of claim 1, wherein the processor is configured to identify the location of the terminal by analyzing a waveform of the transmitted signal.

6. The apparatus of claim 1, wherein the communication unit is configured to transmit information about the identified location of the terminal to the terminal.

7. The apparatus of claim 1, wherein, when terminals are identified at a plurality of locations, the processor is configured to set respective authorization levels for each of the plurality of terminals.

8. The apparatus of claim 7, wherein the processor is configured to set the respective authorization levels further based on available resources of each of the plurality of terminals.

9. The apparatus of claim 7, wherein the processor is configured to allocate a task corresponding to the set authorization level to at least one of the plurality of terminals.

10. The apparatus of claim 7, further comprising a memory configured to store the authorization level of each of the plurality of terminals.

11. A method of identifying a location of a terminal, the method comprising:
in response to detecting a door opening/closing of a vehicle, activating a signal generation module which transmits a signal to the terminal;
receiving, from the terminal, information corresponding to the signal transmitted to the terminal from the signal generation module;
identifying, based on the received information, one of a plurality of different locations in the vehicle as a location of the terminal, each location corresponding to an authorization level for accessing data stored in the vehicle and the authorization levels including a first authorization level and a second authorization level higher than the first authorization level, wherein the second authorization level authorizes access to both first and second data of the data stored in the vehicle and the first authorization level authorizes access to the first data, but not to the second data; and
setting, as an authorization level for the terminal, the authorization level associated with the identified location.

12. The method of claim 11, wherein the signal generation module comprises a plurality of signal generation modules each respectively embedded in a corresponding one of a plurality of doors of the vehicle,
wherein the activating comprises activating signal generation modules embedded in doors that are opened/closed, from among the signal generation modules embedded in the plurality of doors.

13. The method of claim 11, wherein the receiving comprises receiving a signal corresponding to the transmitted signal.

14. The method of claim 11, wherein the receiving comprises receiving information indicative of a waveform of the transmitted signal.

15. The method of claim 11, wherein the identifying comprises identifying the location of the terminal by analyzing a waveform of the transmitted signal.

16. The method of claim 11, further comprising transmitting information about the identified location of the terminal to the terminal.

17. The method of claim 11, further comprising, when terminals are identified at a plurality of locations, setting respective authorization levels for each of the plurality of terminals.

18. The method of claim 17, wherein the setting comprises setting the respective authorization levels further based on available resources of each of the plurality of terminals.

19. The method of claim 17, further comprising allocating a task corresponding to the set authorization level to at least one of the plurality of terminals.

20. A non-transitory computer-readable recording medium having embodied thereon a program which, when executed by a processor, causes an apparatus to perform:
in response to detecting a door opening/closing of a vehicle, activating a signal generation module which transmits a signal to the terminal;
receiving, from a terminal, information corresponding to the signal transmitted to the terminal from the signal generation module;
identifying, based on the received information, one of a plurality of different locations in the vehicle as a location of the terminal, each location corresponding to an authorization level for accessing data stored in the vehicle and the authorization levels including a first authorization level and a second authorization level higher than the first authorization level, wherein the second authorization level authorizes access to both first and second data of the data stored in the vehicle and the first authorization level authorizes access to the first data, but not to the second data; and
setting, as an authorization level for the terminal, the authorization level associated with the identified location.

* * * * *